United States Patent
Perez Rodreguez et al.

(10) Patent No.: US 10,673,784 B1
(45) Date of Patent: Jun. 2, 2020

(54) PROCESSING DELAY PREDICTIONS BASED ON QUEUE ASSESSMENTS

(71) Applicants: Gabriel O. Perez Rodreguez, Fort Lauderdale, FL (US); Fariba Borjian Azadi, Miami, FL (US)

(72) Inventors: Gabriel O. Perez Rodreguez, Fort Lauderdale, FL (US); Fariba Borjian Azadi, Miami, FL (US)

(73) Assignee: C/HCA, Inc., Nashville, TN (US)

( * ) Notice: Subject to any disclaimer, the term of this patent is extended or adjusted under 35 U.S.C. 154(b) by 196 days.

(21) Appl. No.: 15/683,151

(22) Filed: Aug. 22, 2017

Related U.S. Application Data

(60) Provisional application No. 62/379,349, filed on Aug. 25, 2016.

(51) Int. Cl.
*H04L 12/861* (2013.01)
*H04L 29/08* (2006.01)

(52) U.S. Cl.
CPC .............. *H04L 49/90* (2013.01); *H04L 67/10* (2013.01); *H04L 67/18* (2013.01); *H04L 67/22* (2013.01); *H04L 67/26* (2013.01)

(58) Field of Classification Search
CPC ................. H04L 67/22; H04L 67/26
See application file for complete search history.

(56) References Cited

U.S. PATENT DOCUMENTS

| | | | | |
|---|---|---|---|---|
| 6,023,681 A * | 2/2000 | Whitt | ..................... | G06Q 10/06 705/7.29 |
| 6,389,454 B1 * | 5/2002 | Ralston | ............... | G06F 19/3418 709/204 |
| 8,060,500 B1 * | 11/2011 | Fitch | ...................... | G16H 40/20 707/724 |
| 8,484,048 B2 * | 7/2013 | Halsted | .................. | G06Q 50/22 705/3 |
| 8,606,517 B1 * | 12/2013 | Ehrlacher | ........ | G08G 1/096811 701/117 |
| 8,675,861 B2 * | 3/2014 | Matteo | ................ | H04M 3/5238 379/265.02 |
| 8,968,197 B2 * | 3/2015 | Friedlander | .......... | A61B 5/0022 600/301 |
| 9,163,952 B2 * | 10/2015 | Viola | .................... | G01C 21/362 |
| 9,903,730 B1 * | 2/2018 | Berhe | ................ | G01C 21/3492 |
| 9,992,342 B1 * | 6/2018 | Yarnell | ............... | H04M 3/5233 |
| 10,304,276 B2 * | 5/2019 | Schwartz | ............... | G07C 11/00 |
| 10,366,203 B2 * | 7/2019 | Shaw | ..................... | G16H 40/67 |
| 10,380,324 B2 * | 8/2019 | Chiu | ................... | G06F 19/3418 |

(Continued)

FOREIGN PATENT DOCUMENTS

| | | | |
|---|---|---|---|
| JP | 2006277609 A | * | 10/2006 |
| JP | 2009025165 A | * | 2/2009 |
| JP | 2014203416 A | * | 10/2014 |

*Primary Examiner* — Lashonda T Jacobs

(74) *Attorney, Agent, or Firm* — Kilpatrick Townsend & Stockton, LLP

(57) ABSTRACT

Systems and methods of processing delay predictions based on queue assessments are described herein. In some examples, the queues may correspond to queues for usage and/or access of resources. A central server can manage one or more queues for the resources. Queue elements can correspond to requests for performing a task, which can include a task for using and/or accessing a resource. The queue elements can remain in the queue until processing of the task is initiated.

18 Claims, 12 Drawing Sheets

(56) References Cited

U.S. PATENT DOCUMENTS

| | | | |
|---|---|---|---|
| 2004/0249676 A1* | 12/2004 | Marshall | G06Q 10/10 705/2 |
| 2005/0043970 A1* | 2/2005 | Hsieh | G06Q 50/24 705/3 |
| 2006/0010009 A1* | 1/2006 | Fangman | G06Q 10/00 705/2 |
| 2008/0089377 A1* | 4/2008 | Fukuda | H01S 5/028 372/49.01 |
| 2008/0319935 A1* | 12/2008 | Chandak | G06Q 10/109 706/45 |
| 2009/0076875 A1* | 3/2009 | Lert, Jr. | G06Q 30/016 705/14.3 |
| 2009/0198733 A1* | 8/2009 | Gounares | G06F 19/3418 |
| 2010/0131434 A1* | 5/2010 | Magent | G16H 50/20 706/11 |
| 2011/0054946 A1* | 3/2011 | Coulter | G06Q 10/06 705/3 |
| 2012/0316763 A1* | 12/2012 | Haynes, III | G08G 1/09685 701/117 |
| 2013/0006666 A1* | 1/2013 | Schneider | G06F 19/326 705/3 |
| 2013/0173287 A1* | 7/2013 | Cashman | E04H 3/08 705/2 |
| 2013/0226627 A1* | 8/2013 | Kubovcik | G06Q 10/02 705/5 |
| 2013/0290009 A1* | 10/2013 | Rosenblum | G06Q 50/22 705/2 |
| 2013/0304534 A1* | 11/2013 | Mehta | G06Q 10/1095 705/7.19 |
| 2016/0148121 A1* | 5/2016 | Durham | G06Q 10/02 705/2 |
| 2016/0363450 A1* | 12/2016 | Sahay | G01C 21/20 |
| 2017/0046490 A1* | 2/2017 | Bollwinkel | G16H 40/20 |
| 2017/0287316 A1* | 10/2017 | Wildman | G08B 25/10 |
| 2018/0089377 A1* | 3/2018 | Cardonha | G16H 40/20 |
| 2018/0349558 A1* | 12/2018 | Sankar | G16H 50/30 |
| 2019/0088362 A1* | 3/2019 | Rho | G16H 40/20 |
| 2019/0130322 A1* | 5/2019 | Chen | G06N 5/046 |

\* cited by examiner

US 10,673,784 B1

PROCESSING DELAY PREDICTIONS BASED ON QUEUE ASSESSMENTS

CROSS-REFERENCE TO RELATED APPLICATIONS

This application claims the benefit of and priority to U.S. Provisional Application 62/379,349, filed on Aug. 25, 2016, which is hereby incorporated by reference in its entirety for all purposes.

BACKGROUND

This specification relates in general to processing delay predictions in a network environment and, but not by way of limitation, to processing delay predictions based on queue assessments.

The amount of data generated each day continues to grow. When data is current and correct, processing systems and users can rely on it, e.g., to make further downstream decisions and/or processing. When the data, however, is either stale or incorrect, the degree of reliance decreases. In systems that include combinations of human actors, electronic devices, and manual process flows, the steps of capturing, processing, and providing appropriate amounts of current and correct information may be prove troublesome for system operators. This may be especially true when the data represents queue assignments that rely on execution of queue tasks that are divided up between human actors and electronic devices.

BRIEF DESCRIPTION OF THE DRAWINGS

Various examples in accordance with the present disclosure will be described with reference to the drawings, in which.

DETAILED DESCRIPTION

The ensuing description provides preferred exemplary example(s) only, and is not intended to limit the scope, applicability or configuration of the disclosure. Rather, the ensuing description of the preferred exemplary example(s) will provide those skilled in the art with an enabling description for implementing a preferred exemplary example. It is understood that various changes may be made in the function and arrangement of elements without departing from the spirit and scope as set forth in the appended claims.

Figure 1:
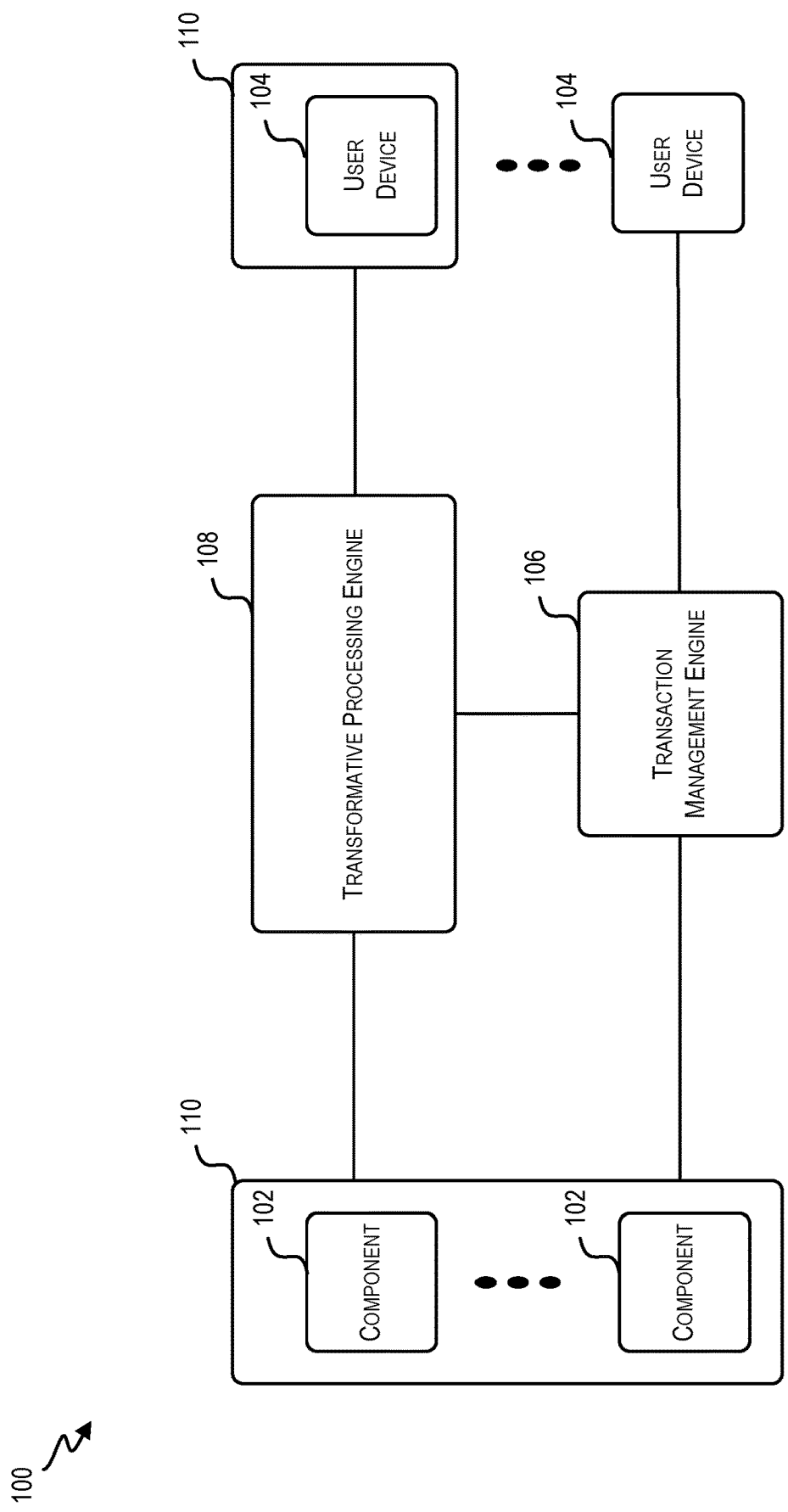
FIG. 1 is an example block diagram illustrating an interaction system in which techniques relating to processing delay predictions based on queue assessments may be implemented, according to at least one example.

Referring first to FIG. 1, a block diagram of an example of an interaction system 100 is illustrated. Generally, in interaction system 100, data can be generated at one or more system components 102 and/or user devices 104. Transaction management engine 106 can manage the flow of communications within interaction system. Transformative processing engine 108 can receive, intercept, track, integrate, process, and/or store such data.

Data flowing in interaction system 100 can include a set of communications. Each of one, some of all communications can include (for example) an encoding type, authentication credential, indication of a content size, identifier of a source device, identifier of a destination device, identifier pertaining to content in the communication (e.g., an identifier of an entity), a processing or reporting instruction, a procedure specification, transmission time stamp, and/or sensor measurement. Data may, or may not, selectively pertain to a particular entity and/or client. Data can, depending on the implementation, include individually identifiable information and/or de-identified information as it pertains to an entity and/or client. Data may, but need not, include protected information.

For example, a system component 102 can include, for example, a sensor to detect a sensor measurement and can thereafter generate and transmit a communication that reflects the sensor measurement. The communication may be transmitted at routine times and/or upon detecting a threshold (e.g., one or more) number of measurements or a measurement satisfying a transmission condition (e.g., exceeding a threshold value). In some instances, the sensor measurement corresponds to one reflecting a property of an object or entity (e.g., person) near the sensor. The communication may then include an identifier of the object or entity. The identifier can be determined, for example, based on detection of a nearby electronic tag (e.g., RFID tag), a detected user input received at a user interface of component 102, and/or data in a corresponding communication received from a user device.

As another example, a user device 104 can be configured to detect user input received at a user interface of the device. The user input can include, for example, an identifier of an object or entity, an instruction, a characterization of an object or entity, an identification of an assessment to be performed, a specification of an aggregation or data processing to be performed, and/or an identification of a destination for a data-analysis report. User device 104 can further be configured to detect user input requesting particular data, to generate a request communication (e.g., to be sent to transformative processing engine), to receive the requested data and/or to present the received data.

Data can include information that identifies a person, such as personal information and/or demographic information. For example, the information can identify a person's name, age, sex, race, physical address, phone number, email address, and/or social security number. Data may include information collected by a government agent, employer, insurer, or school or university, that relates to a past, present, or future condition or status (e.g., pertaining to employment, political involvement, occupation, health, or financial status) of any individual. For example, data may include information about past events.

Data may identify an entity being evaluated and/or one at least partly performing an evaluation. For example, a communication may identify a first company as one being evaluated and a second company as one evaluating a quality of a product of the first company. As another example, a communication may identify a first service plan of a first company as one providing an Internet network and may identify one or more users providing speed checks over the network.

The depicted engines, devices and/or components can communicate over one or more networks. A network of one or more networks can include a wired network (e.g., fiber, Ethernet, powerline ethernet, ethernet over coaxial cable, digital signal line (DSL), or the like), wireless network (e.g., Zigbee™, Bluetooth™, WiFi™, IR, UWB, WiFi-Direct, BLE, cellular, Long-Term Evolution (LTE), WiMax™, or the like), local area network, the Internet and/or a combination thereof. It will be appreciated that, while one or more components 102 and one or more user devices 104 are illustrated as communicating via transformative processing engine 108 and/or transaction management engine 106, this specification is not so limited. For example, each of one or more components 102 may communicate with each of one or more user devices 104 directly via other or the same communication networks.

A component 102 can be configured to detect, process and/or receive data, such as environmental data, geophysical data, biometric data, chemical data (e.g., chemical composition or concentration analysis data), and/or network data. The data can be based on data detected, for example, via a sensor, received signal or user input. A user device 104 can include a device configured to receive data from a user and/or present data to a user. It will be appreciated that, in some instances, a component 102 is also a user device 104 and vice-versa. For example, a single device can be configured to detect sensor measurements, receive user input and present output.

A component 102 can be configured to generate a communication that is in one or more formats, some of which can be proprietary. For example, an imaging machine (e.g., one of one or more components 102) manufactured by company A, located within a first facility (e.g., facility 110), and belonging to a first client, may save and transfer data in a first format. An imaging machine (e.g., one of one or more components 102) manufactured by company B, located within the first facility (e.g., facility 110), and belonging to the first client, may save and transfer data in a second format. In some examples, data from certain components is transformed, translated, or otherwise adjusted to be recognizable by transformative processing engine 108. Thus, continuing with the example from above, when the imaging machines manufactured by companies A and B are located within the first facility belonging to the first client, they may nevertheless save and transfer data in different formats. In some examples, one or more components 102 communicate using a defined format.

In some examples, each of one or more components 102 are each associated with one or more clients within a same or different interaction systems. For example, certain ones of one or more components 102 may be associated with a first client, while other ones of one or more components 102 may be associated with a second client. Additionally, each of one or more components 102 may be associated with a facility 110 (e.g., client facility). Each facility 110 may correspond to a single location and/or processing focus. Exemplary types of facilities include server farm facilities, web-server facilities, data-storage facilities, technical-support facilities, telecommunication facilities, care facilities, and/or business operation facilities. For example, a first facility may include a structure at a first location at which one or more resources (e.g., computational resources, equipment resources, laboratory resources, and/or human resources) are provided. Each of the one or more resources may be of a first type in a first set of types. A resource type can be identified based on, for example, a characteristic of the resource (e.g., sensor inclusion) and/or a capability of providing each of one or more services. Thus, for example, resources at a first facility may be better configured for handling a particular type of service requests compared to those in another facility. As another example, different facilities may include resources of similar or same types but may vary in terms of, for example, user accessibility, location, managing client, etc.

Transmission of data from one or more components 102 to transformative processing engine 108 may be triggered by a variety of different events. For example, the data may be transmitted periodically, upon detection of an event (e.g., completion of an analysis or end of a procedure), upon detection of an event defined by a rule (e.g., a user-defined rule), upon receiving user input triggering the transmission, or upon receiving a data request from transformative processing engine 108. Each transmission can include, e.g., a single record pertaining to a single entity, object, procedure, or analysis or multiple records pertaining to multiple entities, objects, procedures, or analyses.

In some examples, at least some of one or more user devices 104 are associated with facility 110. In some examples, at least some of one or more user devices 104 need not be associated with facility 110 or any other facility. Similar to one or more components 102, one or more user devices 104 may be capable of receiving, generating, processing, and/or transmitting data. Examples of one or more user devices 104 include, for example, a computer, a mobile device, a smart phone, a laptop, an electronic badge, a set-top box, a thin client device, a tablet, a pager, and other similar user devices). One or more user devices 104 may be configured to run one or more applications developed for interacting with data collected by transformative processing engine 108. For example, those user devices of one or more user devices 104 that are not associated with facility 110 may be configured to run one or more third-party applications that may rely in part on the data gathered by transformative processing engine 108.

Each of one or more components 102 and one or more user devices 104 may be utilized by one or more users (not shown). Each of the one or more users may be associated with one or more clients. For example, one of the one or more users can be associated with a client as a result of being employed by the client, physically located at a location of the client, being an agent of the client, or receiving a service from the client.

In some examples, one or more components 102 and one or more user devices 104 may communicate with transformative processing engine 108 and transaction management engine 106 via different information formats, different proprietary protocols, different encryption techniques, different languages, different machine languages, and the like. As will be discussed with reference to FIG. 2, transformative processing engine 108 is configured to receive these many different communications from one or more components 102, and in some examples from one or more user devices 104, in their native formats and transform them into any of one or more formats. The received and/or transformed communications can be transmitted to one or more other devices (e.g., transaction management engine 106, an entity device, and/or a user device) and/or locally or remotely stored. In some examples, transformative processing engine 108 receives data in a particular format (e.g., the HL7 format) or conforming to any other suitable format and/or is configured to transform received data to conform to the particular format.

One or more components 102 of facility 110 can include and/or has access to a local or remote memory for storing generated data. In some examples, the data is stored by one or more servers local to facility 110. Such storage may enable facility 110 to retain locally data pertaining to its facility prior to (or in conjunction with) the data being shared with transformative processing engine 108 and/or transaction management engine 106. In some examples, the one or more servers of facility 110 share data directly with a record service (not shown), and the record service makes the data available to transformative processing engine 108 and/or transaction management engine 106. Once an electronic record is updated at facility 110, an indication of the update may be provided to the record service. The record service may then update a corresponding record associated with the electronic record.

The record service can be granted access to the data generated and/or transmitted by one or more components 102. In some examples, the record service includes a server or a plurality of servers arranged in a cluster or the like. These server(s) of the record service can process and/or store data generated by one or more components 102. For example, one or more records can be generated for each entity (e.g., each record corresponding to a different entity or being shared across entities). Upon receiving a communication with data from a component (or facility), the record service can identify a corresponding record and update the record to include the data (or processed version thereof). In some examples, the record service provides data to transformative processing engine 108.

Facility 110 can include one at which a resource is located and/or service is provided. Irrespective of the type of facility, facility 110 may update data, maintain data, and communicate data to transformative processing engine 108. At least some of the data may be stored local to facility 110.

A user interacting with a user device 104 can include, for example, a client customer, client agent and/or a third party. A user may interact with user device 104 and/or component 102 so as to, for example, facilitate or initiate data collection (e.g., by a component 102), provide data, initiate transmission of a data request, access data and/or initiate transmission of a data-processing or data-storage instruction. In some instances, one or more user devices 104 may operate according to a private and/or proprietary network or protocols. In other examples, one or more user devices 104 may operate on public networks. In any case, however, transformative processing engine 108 can have access to the one or more components and can communicate with them via a public, private, and/or proprietary network or protocols. The use of one or more private and/or proprietary protocols can promote secure transfer of data.

Figure 2:
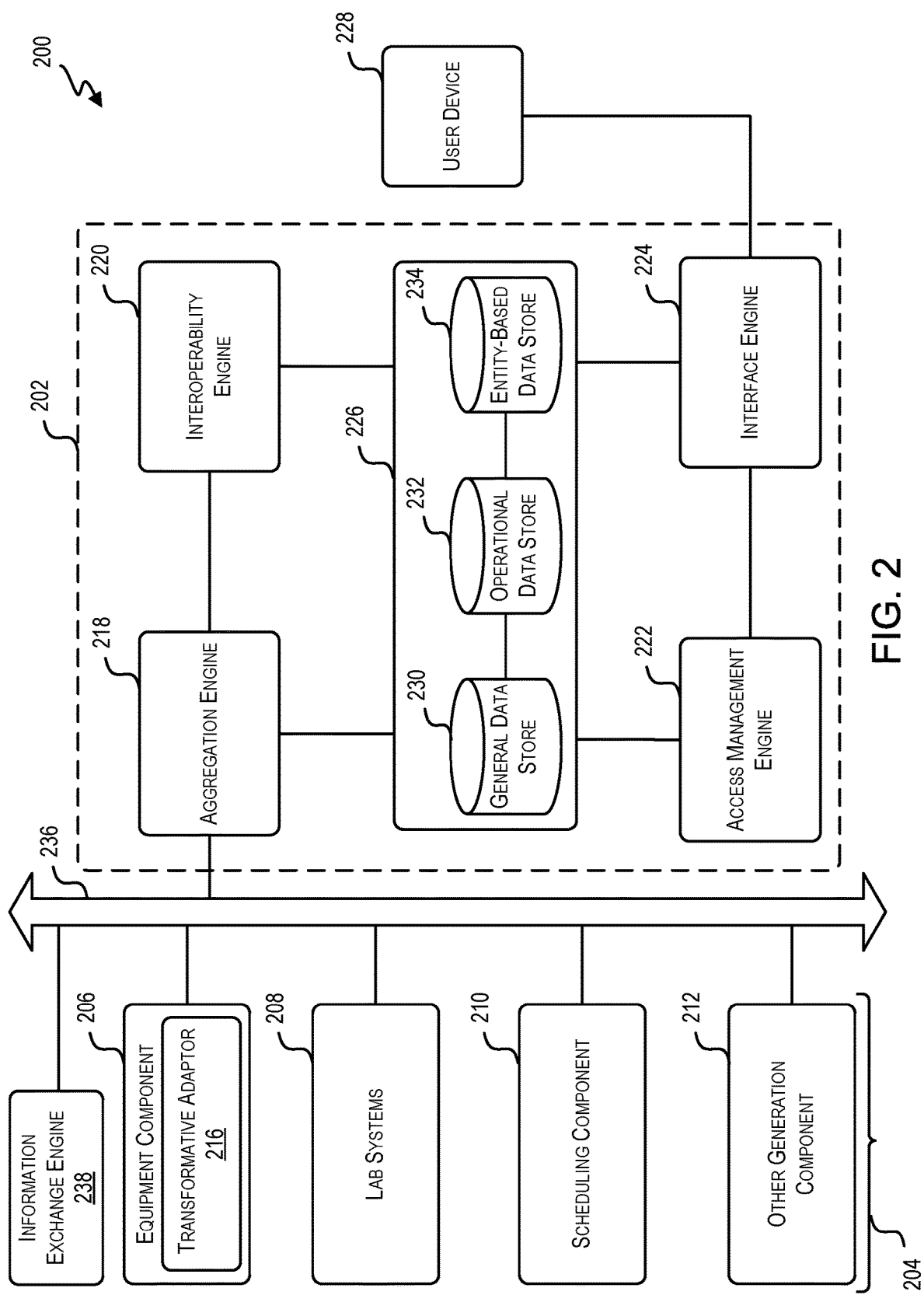
FIG. 2 is an example block diagram illustrating an interaction system in which techniques relating to processing delay predictions based on queue assessments may be implemented, according to at least one example.

Referring next to FIG. 2, a block diagram of an example of an interaction system 200 is shown. Interaction system 200 includes a transformative processing engine 202. Transformative processing engine 202 is an example of transformative processing engine 108 discussed with reference to FIG. 1. Interaction system 200 also includes one or more generation components 204. In particular, one or more generation components 204 include an equipment component 206, a lab systems component 208, a scheduling component 210, and other generation component 212. One or more generation components 204 are examples of one or more components 102 discussed with reference to FIG. 1. In some examples, the data may pass to the transformative processing engine 202 via an information exchange service bus 236 (e.g., an enterprise service bus). In some examples, only a portion of the is passed via the information exchange service bus 236, while other portions are passed directly to the transformative processing engine 202 without first passing over the information exchange service bus 236.

Generally, one or more generation components 204 includes any suitable device or system capable of generating data in the context of an interaction system. For example, the other generation component 212 may include a sensor on a door, and equipment component 206 may include a sophisticated computer-controlled laser device. In either case, each generation component generates some type of data. For example, the data provided by the sensor may be used to address security concerns or assessing heating, ventilating, and air conditioning (HVAC) costs for an institution. The data provided by the laser device may have been provided while engaged in a procedure and may then be used by other entities in the future to decide how to use the device.

As discussed in further detail herein, data generated by one or more generation components 204 can be of a variety of formats, some of which may be proprietary. For example, a single component can generate data in multiple formats, different components can generate data in different formats, and/or different component types can result in generation of data in different formats. In some instances, formatting of a data can depend on a service having been provided, a user initiating data generation, a destination to receive the data, a location at which a service was provided, etc. In some examples, a typical interaction system includes thousands of generation components producing data in hundreds of formats. In order to harness the power that comes from such a large amount of data to make informed decisions, it is desirable that all, or at least a large portion of the data, is shared. Use of transformative processing engine 202 in accordance with techniques described herein may achieve this design—making large amounts of data, in many different originating formats available to various types of users, via one or more interfaces. At least a portion of the data generated by the generation components 204 may be provided to the transformative processing engine 202. In some examples, each generation component 204 includes an agent that executes on the generation components 204 and determines which data to send to the transformative processing engine 202 and other engines described herein. In some examples, the generation components 204 provide data to the transformative processing engine 202 via a messaging bus (e.g., an information exchange service bus 236). The messaging bus, which may be included in the transformative processing engine 202 or separate, is able to see data that moves throughout the interaction system 200. The information exchange service bus 236 also includes a subscription registry that can be used to manage subscriptions to the information exchange service bus 236 for certain data (e.g., data having certain characteristics). The information exchange service bus 236 may send and/or direct data to certain other entities when appropriate as indicated by subscription records in the registry.

While one or more generation components 204 are illustrated adjacent to each other, it is understood that each may be located within one facility or that the components may be spread out among many facilities. In addition, in some examples, one or more generation components 204 belong to different clients.

Turning now to equipment component 206, this component includes any machine, contrivance, implant, or other similar related article, that is intended to aid in reaching a particular objective. In some instances, equipment component 206 includes one or more sensors to detect environmental or other stimuli. Equipment component 206 can include, for example, equipment to monitor a stimulus, detect stimulus changes, detect stimulus-indicative values, and so on. Exemplary equipment components 206 include an imaging device, a device that detects and characterizes electrical signals, a device that detects pressure, and/or a device that detects concentration of one or more particular elements, compounds and/or gases.

As illustrated, equipment component 206 includes transformative adaptor 216. In some examples, transformative adaptor 216 is a device that transforms, translates, converts, or otherwise adjusts output data from equipment component 206. For example, an equipment component 206 can be a scanner that outputs its results in format A, but the majority of other scanners in the interaction system output their results in format B. Transformative adaptor 216 may be implemented to convert or otherwise adjust the results in format A to conform closer to format B. For example, the conversion from format A to format B may be performed using a conversion rule, which may be user-define or learned. Transformative processing engine 202 may perform similar tasks as it relates to all data generated within interaction system 200. In this manner, transformative adaptor 216 can perform an initial step in the process of transformation, translation, conversion, or adjustment of the output of equipment component 206. In some examples, transformative adaptor 216 is implemented in hardware, software, or any suitable combination of both. In some examples, other transformative adaptors (not shown) may be implemented within others of one or more generation components 204. In some examples, equipment component 206 may not include transformative adaptor 216.

Lab systems component 208 includes any suitable laboratory equipment or system that is intended to analyze material, such as biological material. This includes, for example, laboratory equipment that analyzes biological samples; electric microscopes; ultracentrifuges; data collection devices, including Kymographs, sensors connected to a computer to collect data; monitoring devices; computers used to report results of lab tests, and other similar laboratory equipment. Each of the above-listed components generates data that is provided (directly or indirectly) to transformative processing engine 202.

Scheduling component 210 includes any suitable computing devices used for business-related purposes with respect to interaction system 200. For example, scheduling component 210 can be configured to schedule a resource for allocation for a particular entity during a particular time slot. Scheduling component 210 can monitor a schedule for the resource and can identify one or more available time slots that may be secured by a particular entity. Upon receiving a scheduling indication, scheduling component 210 may update a schedule of a resource to reflect that a particular time slot is to be allocated for service of a particular entity.

Each of one or more generation components 204 and the user device 228 may include individual and/or shared storage systems, one or more processors, a user interface, a network connectivity device, and one or more ports. The storage system include memory that may be implemented, e.g., using magnetic storage media, flash memory, other semiconductor memory (e.g., DRAM, SRAM), or any other non-transitory storage medium, or a combination of media, and can include volatile and/or non-volatile media. The storage systems may also be configured to store computer-executable code or instructions for interacting with the user interface and/or for one or more applications programs, such as an application program for collecting data generated by the particular generation component.

The one or more processors may be configured to access the operating system and application programs stored within the storage systems, and may also be configured to execute such program code. The one or more processors can be implemented as one or more integrated circuits, e.g., one or more single-core or multi-core microprocessors or microcontrollers, examples of which are known in the art. In operation, the one or more processors can control the operation of the particular component. The one or more processors may access and execute the program code and at any given time.

The user interface can include any combination of input and output devices. In some instances, a user can operate input devices of the user interface to invoke the functionality of the particular component or user device. For example, the user interface may enable the user to view, hear, and/or otherwise experience output from component or user device via the output devices of the user interface. Examples of output devices include a display, speakers, and the like.

The network connectivity device may enable the component or user device to communicate with transformative processing engine 202 and other components or other user devices via one or more networks. The one or more networks may include any suitable combination of cable, cellular, radio, digital subscriber line, or any other suitable network, which may be wired and/or wireless. In some examples, the network connectivity device may enable the component or the user device to communicate wirelessly with various other components and/or transformative processing engine 202. For example, the components may include circuitry to enable data communication over a wireless medium, e.g., using near-field communication (NFC), Bluetooth Low Energy, Bluetooth® (a family of standards promulgated by Bluetooth SIG, Inc.), Zigbee, Wi-Fi (IEEE 802.11 family standards), or other protocols for wireless data communication.

The one or more ports may enable the component or the user device to receive data from one or more sensors. The sensors may be any suitable type of sensor to capture data. Such captured data may be shared with transformative processing engine 202 in accordance with techniques described herein. In some examples, the sensors may also be configured to detect the component's or the user device's location and other details about the component or the user device. In some examples, the component and user device may include global positioning chips for determining a geolocation. Such geolocation information may be relevant to analyzing the data provided by the component or the user device located at the geographic location.

Transformative processing engine 202 includes an aggregation engine 218, an interoperability engine 220, an access management engine 222, an interface engine 224, and a data store 226. Generally aggregation engine 218 is configured to collect data from multiple communications. The data may be from one or multiple generation components 204 and/or may be of same or different formats. Aggregation engine 218 may be configured to perform one or more operations on the collected data. For example, aggregation engine 218 may tag data, log data, perform protocol conversion, and may support one-to-many communications. The collection may be asynchronous. In some examples, the data has been saved locally in connection with one or more generation components 204 in many different formats having many different data structures.

Aggregation engine 218 can identify data to be aggregated based on, for example, intra-communication data, a current time, a source generation component, and/or one or more aggregation rules. For example, an aggregation rule may specify that data is to be aggregated across all communications that include content with a same entity identifier. An aggregation may be dynamic. For example, aggregated data may reflect that from within a most recent 12-hour period. Thus, an aggregation may be updated in time to exclude older data from the aggregation and to include newer data.

Aggregation engine 218 can be configured to provide data from one or more communications to interoperability engine 220. Interoperability engine 220 can be configured to perform one or more operations on the received data and store it in data store 226. For example, interoperability engine 220 may perform semantic tagging and indexing of data. This may include extracting field values from data, categorizing data (e.g., by type of data, characteristic of an entity, location of facility, characteristic of facility, and the like), anonymizing or partially-anonymizing data, and the like. Interoperability engine 220 may also include a high availability cache, an alerts engine, and a rules engine. In some examples, interoperability engine 220 operates synchronously.

From interoperability engine 220, data flows to data store 226. Data store 226 (and any other data store discussed herein) may include one or more data stores, which may be distributed throughout two or more different locations (e.g., present on different devices, which can include devices of different entities and/or a cloud server). In some examples, data store 226 includes a general data store 230, an operational data store 232, and an entity-based data store 234. Within each of the data stores 230, 232, and 234 is stored data. Depending on the structure of the particular data store, certain data stores may include rules for reading and writing. The data stores 230, 232, and 234 may include records, tables, arrays, and the like, which may be relational or non-relational. Depending on the data store, records for individual entities, business and analytics information, output data from one or more generation components 204, and the like may be retained. The data within the data stores 230, 232, and 234 include elements or tags such that a particular data (e.g., for a single entity, protocol, etc.) can be retrieved.

Access management engine 222 is configured to manage access to features of transformative processing engine 202, including access to the data retained in data store 226. For example, access management engine 222 may verify that a user device such as user device 228 is authorized to access data store 226. To verify the user device 228, access management engine 222 may require that a user of the user device 228 input a username and password, have a profile associated with the interaction system, have paid a subscription fee associated with access to data store 226, and the like. Access management engine 222 may also verify that the user device 228 has an IP address or geographical location that corresponds to an authorized list, that the user device 228 includes a plug-in for properly accessing the data store 226, that the user device 228 is running certain applications required to access the data store 226, and the like.

Interface engine 224 is configured to retrieve the data from data store 226 and provide one or more interfaces for interacting with elements of transformative processing engine 202. For example, interface engine 224 includes an interface by which an application running on user device 228 can access portions of data within data store 226.

As described herein, an information exchange engine 238 shares a network connection with the information exchange service bus 236. The information exchange engine 238 is configured to monitor data (e.g., messages) that is passed over the information exchange service bus 236 and, from the monitored data, select certain portions to provide to one or more authorized users (e.g., dependent users, friends and family members of dependent users, professional users, and other suitable authorized users). The information exchange engine 238 is also configured to route inbound messages and route outbound messages, as described herein. The information exchange engine 238 is also configured to generate customized messages based on dependent user data and professional users.

Figure 3:
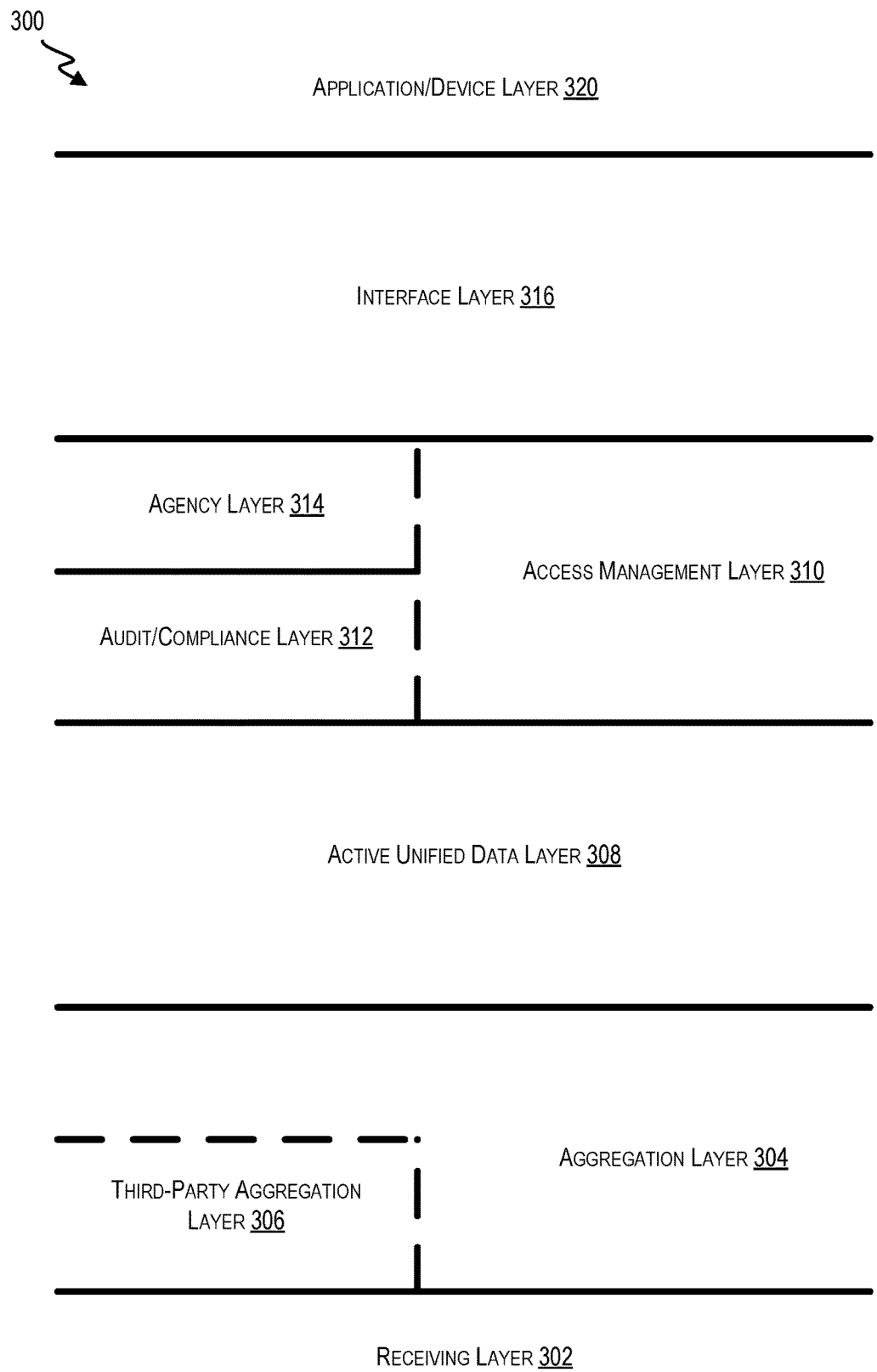
FIG. 3 is an example schematic model illustrating a network communication model in which techniques relating to processing delay predictions based on queue assessments may be implemented, according to at least one example.

Turning next to FIG. 3, an architecture stack 300 is shown. In some examples, techniques relating management of data are implemented in accordance with architecture stack 300. And while architecture stack 300 is illustrated as having a particular structure, it is understood that other structures, including those with more or less layers than illustrated, is within the scope of this specification. In some examples, architecture stack 300 is implemented across an interaction system having a plurality of systems belonging to the same client or spread across different clients. Thus, architecture stack 300 can be used to integrate different systems of different organizations, entities, and the like and to provide a fluid sharing of information among elements within the interaction system and without the interaction system. In some instances, a multi-layer part of architecture stack 300 is implemented at a single system or device within an interaction system.

The different layers of architecture stack 300 will be described generally with reference to FIG. 3 and in detail with reference to subsequent figures. Architecture stack 300 includes a receiving layer 302 as the bottom-most layer. Receiving layer 302 includes receiving data from elements that share data with other elements within an aggregation layer 304. For example, as detailed herein, receiving layer 302 can include receiving data from generation components that generate data. As such, receiving layer 302 is where the data that has been created is received. In some examples, the data within receiving layer 302 may be in its raw formats. The output may then be transmitted to aggregation layer 304. In some examples, components of receiving layer 302 may have complimentary layers to facilitate data transfer. For example, the components may include a data generation and/or a data transmission layer for providing data to receiving layer 302.

Elements of aggregation layer 304 aggregate the data generated by the elements of receiving layer 302. For example, the elements of aggregation layer 304 may include aggregation engines that collect data from generation components located within receiving layer 302. Such aggregation may be performed periodically, in response to a user request, according to a schedule, or in any other suitable manner. In some examples, data of aggregation layer 304 may be aggregated according to input and/or rules and may aggregate across records pertaining to, e.g., a facility, entity, time period, characteristic (e.g., demographic characteristic or condition), outcome, and any other suitable input and/or rules. The aggregation may include compiling the data, generating a distribution, generating a statistic pertaining to the data (e.g., average, median, extremum, or variance), converting the data, transforming the data to different formats, and the like.

Next, architecture stack 300 includes an active unified data layer 308. Elements of active unified data layer 308 receive data from the elements of the other layers and store such data in a unified manner. In some examples, this may include storing the data in a manner that allows for later searching and retrieval using a defined set of method calls, techniques, and or procedures. For example, the data may be stored such that a different application can access the data in a standard or unified manner. Thus, elements of active unified data layer 308 may receive information collected or generated within aggregation layer 304 and make certain adjustments to the data (e.g., translations, tagging, indexing, creation of rules for accessing the data, conversion of formatting of the data, generation of compressed versions, and the like) prior to retaining the data within one or more data stores accessible within active unified data layer 308.

Architecture stack 300 also includes an access management layer 310, which can include an audit/compliance layer 312 and/or an agency layer 314. Access management layer 310 includes elements to manage access to the data. For example, access management layer 310 may include elements to verify user login credentials, IP addresses associated with a user device, and the like prior to granting the user access to data stored within active unified data layer 308.

Audit/compliance layer 312 includes elements to audit other elements of architecture stack 300 and ensure compliance with operating procedures. For example, this may include tracking and monitoring the other elements of access management layer 310.

Agency layer 314 includes an access location (e.g., a virtual private network, a data feed, or the like) for elements of agencies that are interested in the operations of the interaction system in which architecture stack 300 is implemented. For example, agency layer 314 may allow a governmental entity access to some elements within architecture stack 300. This may be achieved by providing the governmental entity a direct conduit (perhaps by a virtual private network) to the elements of access management layer 310 and the data within active unified data layer 308. Audit/compliance layer 312 and agency layer 314 are sub-layers of access management layer 310.

Architecture stack 300 also includes interface layer 316. Interface layer 316 provides interfaces for users to interact with the other elements of architecture stack 300. For example, clients, entities, administrators, and others belonging to the interaction system may utilize one or more user devices (interacting within application/device layer 320) to access the data stored within active unified data layer 308. In some examples, the users may be unrelated to the interaction system (e.g., ordinary users, research universities, for profit and non-profit research organizations, organizations, and the like) and may use applications (not shown) to access the elements within architecture stack 300 via one or more interfaces (e.g., to access data stored within active unified data layer 308). Such applications may have been developed by the interaction system or by third-parties Finally, architecture stack 300 includes application/device layer 320. Application/device layer 320 includes user devices and applications for interacting with the other elements of architecture stack 300 via the elements of interface layer 316. For example, the applications may be web-based applications, entity portals, mobile applications, widgets, and the like for accessing the data. These applications may run on one or more user devices. The user devices may be any suitable user device as detailed herein.

Figure 4:
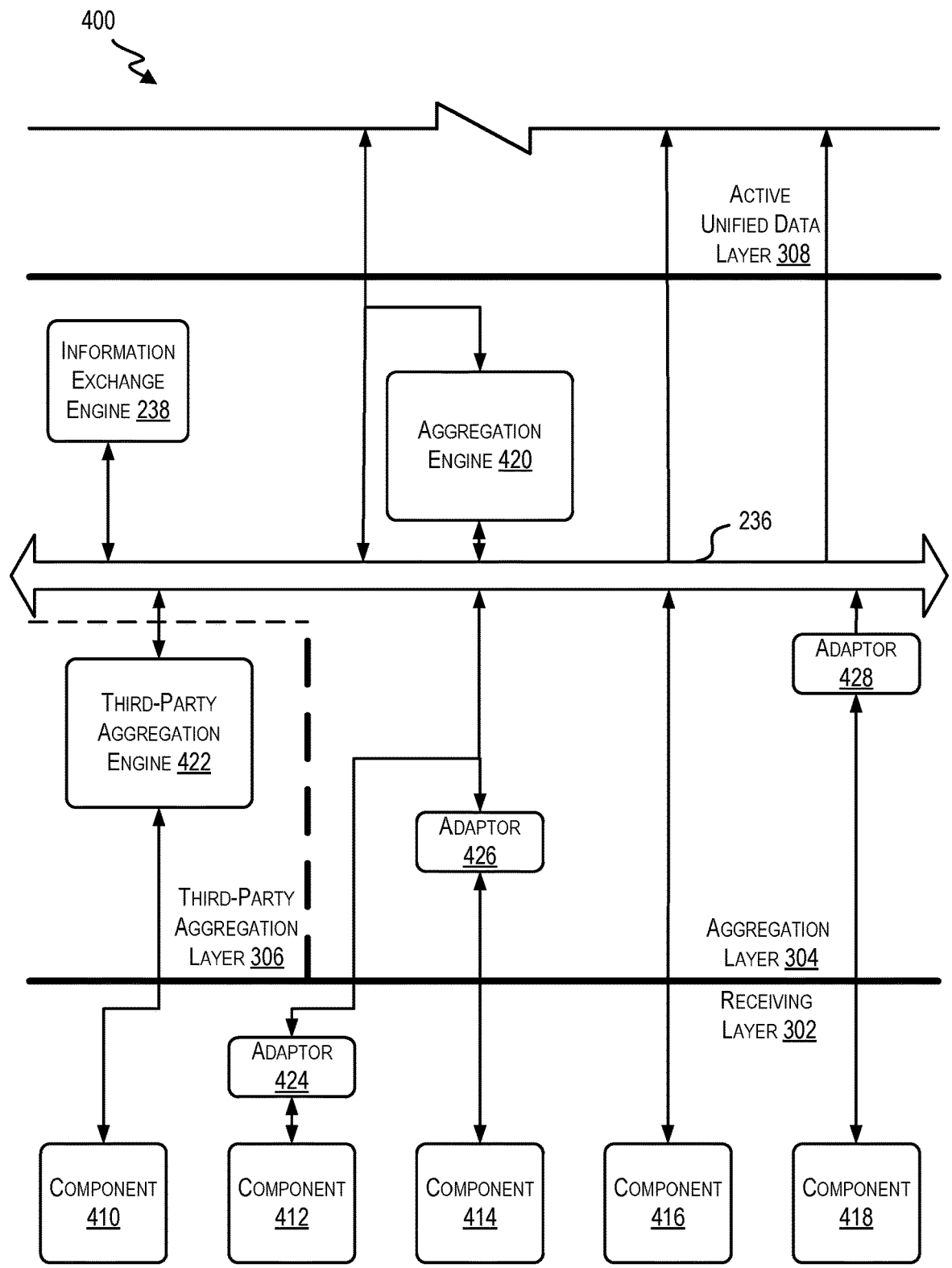
FIG. 4 is an example schematic model illustrating an aspect of the network communication model of FIG. 3 in more detail.

Turning next to FIG. 4, a diagram 400 is shown that depicts a portion of architecture stack 300 according to at least one example. In particular, the diagram 400 includes receiving layer 302, aggregation layer 304, aggregation layer 306, and a portion of active unified data layer 308. Receiving layer 302 receives data from one or more components 410-418. Components 410-418 are examples of one or more generation components 204. Components 410-418 may be spread across multiple facilities within a single or multiple clients. In some examples, components 410-418 may include complimentary layers to facilitate data transmission. For example, components 410-418 may include a transmission layer, generation layer, and/or a receiving layer to communicate data at receiving layer 302 and, in some examples, receive data from receiving layer 302.

In some instances, two or more of components 410-418 generate data according to different formats. The data can then be transformed, translated, or otherwise adjusted before an aggregation engine 420 (e.g., aggregation engine 218) or a third-party aggregation engine 422 (e.g., aggregation engine 218) collects the data. In some examples, the adjustment takes place within receiving layer 302. Thus, an adaptor 424 is associated with component 412 located in receiving layer 302. Adaptor 424 is an example of transformative adaptor 216. Adaptor 424 is implemented, as appropriate, in hardware, software, or any suitable combination of both. For example, transformative adaptor 216 may be a bolt-on adaptor that adjusts data as such data leaves component 412.

Other adaptors, such as adaptor 426 and adaptor 428, are implemented within aggregation layer 304. These adaptors can function in a similar manner as adaptor 424. In some examples, the data provided by component 414 is transmitted through adaptor 426 prior to being directed to aggregation engine 420. The data provided by component 416 is transmitted through aggregation layer 304 and/or enters aggregation engine 420 without having first traveled through an adaptor. The data provided by component 418 is transmitted through aggregation layer 304 and through adaptor 428. In some examples, component 418 provides for streaming of data. The data provided by component 410 is transmitted directly to third-party aggregation engine 422.

Aggregation engine 420 and third-party aggregation engine 422 function in a similar manner. In some examples, third-party aggregation engine 422 is operated by a different entity than the entity that operates aggregation engine 420 and may belong to different clients or a different interaction system. This may be because the data collected by third-party aggregation engine 422 differs in some way from the data collected by aggregation engine 420. In any event, aggregation engine 420 is configured to perform integration of data, including generic integration. For example, aggregation engine 420 performs one or more operations on data including tagging, logging, and protocol conversion. Aggregation engine 420 also supports one-to-many communications of data. In some examples, data flows between aggregation engine 420, the third-party aggregation engine 422, and some of components 410-418 and elements of active unified data layer 308.

The diagram 400 also includes the information exchange service bus 236 and the information exchange engine 238. As introduced herein, messages passing through the aggregation layer 304 can pass over the information exchange service bus 236. In this manner, the information exchange engine 238 can access the messages, route the messages, and/or customize the messages.

Figure 5:
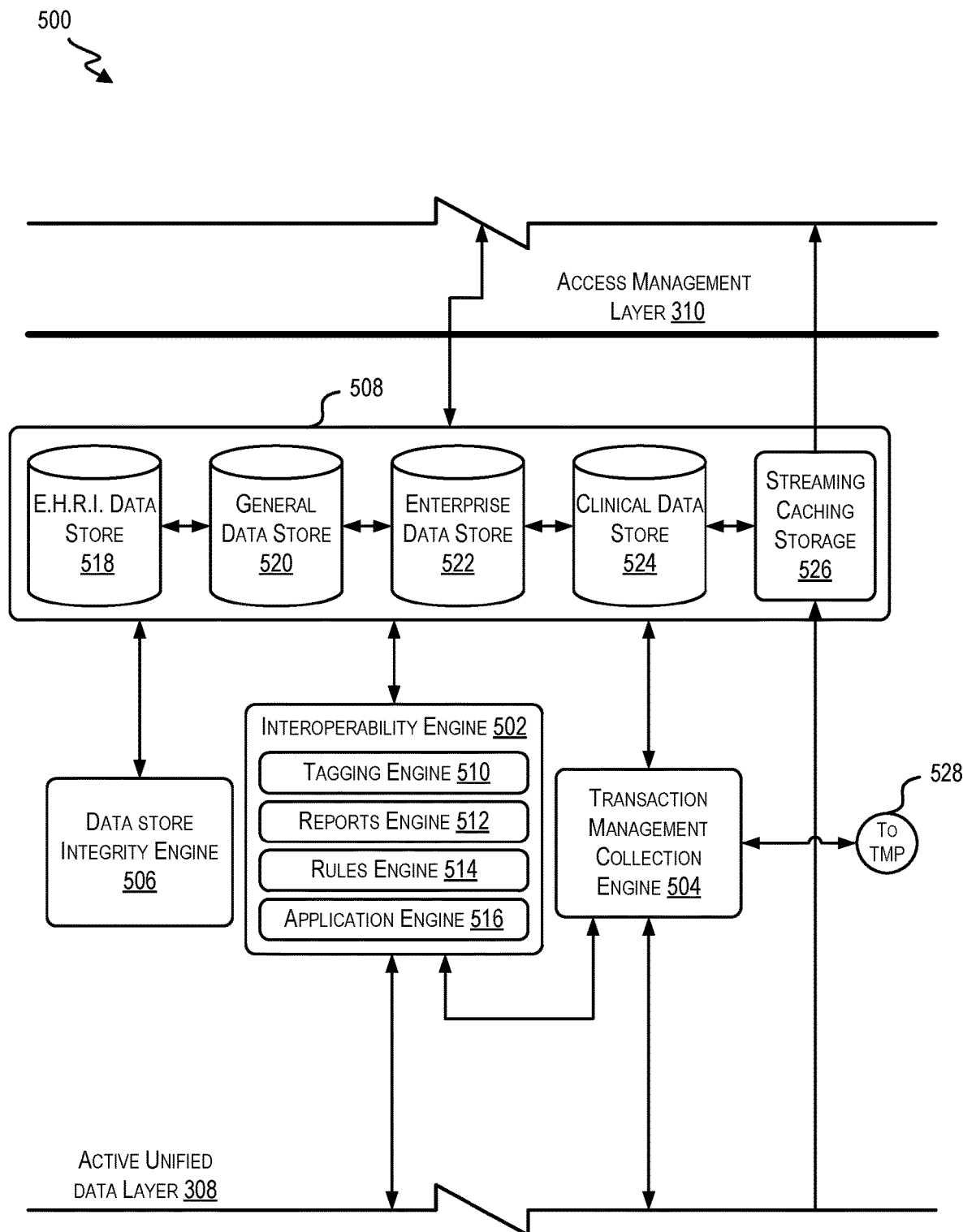
FIG. 5 is an example schematic model illustrating an aspect of the network communication model of FIG. 3 in more detail.

Referring next to FIG. 5, a diagram 500 is shown that depicts a portion of architecture stack 300 according to at least one example. In particular, diagram 500 includes active unified data layer 308 and a portion of access management layer 310. Active unified data layer 308, as illustrated in diagram 500, includes an interoperability engine 502 (e.g., interoperability engine 220), a transaction management collection engine 504, a data store integrity engine 506, and a data store 508 (e.g., data store 226). Generally, interoperability engine 502 receives data from elements within aggregation layer 304 (e.g., from aggregation engine 420) and performs one or more operations with respect to the data. Interoperability engine 502 also facilitates storage of at least a portion of the processed information in data store 508.

Transaction management collection engine 504 is implemented as part of transaction management engine 106. Transaction management collection engine 504 is configured to generate message indicators identifying flows of data by and between elements of an interaction system implemented using the techniques described herein. The flows of information include messages which include data, and the message indicators include unique message identifiers that can be used to identify the messages. The unique message identifiers include information that can be used to uniquely identify the messages. For example, a unique message identifier for a particular message can include a concatenation of the following information stored in a table: a source application, a facility, a message type, and a message control identification (ID). The unique message identifier can also be the message control ID. The unique message identifier may be created as messages including data are transmitted from aggregation layer 304.

In some examples, the table also includes information for tracking the progress of the message from an origination node to a destination node. For example, typically when a message (e.g., any communication of data) is first received by transformative processing engine 108 (e.g., interoperability engine 502), transaction management engine 106 (e.g., transaction management collection engine 504 of transaction management engine 106) may generate a unique identifier for the message in order to track that message as it moves throughout the interaction system. The unique identifier may be included in the header of the message such that when the next node (e.g., component, device, server, etc.) after transformative processing engine 108 receives the message, that node can report back to transaction management engine 106 that it saw the message. In this manner, transaction management engine 106 may enable end-to-end tracking of messages for the life of the message.

In one example, the messages are requests. The requests may be generated based on user input at one of the components. The requests may be received by transformative processing engine 108 and integrated into the system. In some examples, transaction management engine 106 may be notified that the requests have been received and may therefore be configured to generate message IDs for each request. These message IDs may then be associated with each of the requests. As the requests continue to move throughout the interaction system (e.g., away from transformative processing engine 108), transaction management engine 106 may be track their movement using the message IDs. If one of the requests does not make it to its destination, transaction management engine 106 may determine why the request was stopped. In some examples, this cause may be hardware related (e.g., an unplugged Ethernet cable, a broken router, etc.), software related (e.g., a router routing to the wrong location), or any other reason for orders not arriving at their correct destination.

In some examples, transaction management engine 106 (e.g., transaction management collection engine 504 of transaction management engine 106) may receive the message and/or message identifier directly from one of components 410-418. For example, one of components 410-416 may be configured to generate the unique message identifier and/or communicate directly with transaction management engine 106. The message also may travel via one or more intermediate nodes on its way to the destination node. In some examples, a node is a component such as components 410-418, which may be running an application. In some examples, the unique identifier and the routing of the message to its destination may be stored in a table that also includes: a geolocation of each node, a network from which the message originated, a type of node, the unique node identifier, and a time associated with the message leaving the origination node. In some examples, transaction management collection engine 504 provides unique message identifiers to other elements of the interaction system to monitor the messages as they move throughout the interaction system. Transaction management collection engine 504 also provides a portion of the unique message identifiers to a transaction management platform (indicated by a circle 528) for further analysis of the message identifiers. Such analysis may include reconciliation of lost messages, latency reporting, audit management and compliance, and other such analyses.

As mentioned previously, interoperability engine 502 is configured to store data in data store 508. A plurality of sub-engines 510-516 of interoperability engine 502 are configured to perform operations relating to storing data in data store 508.

Interoperability engine 502 includes a tagging engine 510 configured to perform semantic tagging and indexing of data. Tagging engine 510 therefore is configured to receive data, read metadata associated with the data, semantically scan the content of the data, and associate one or more tags with the data. Tagging engine 510 may therefore have access to hundreds, thousands, or even more possible tags. These tags may have been input by users, learned, pre-defined, generated by outside third-party mapping sources, and/or gathered from other components and/or data stores of the interaction system. For example, if the data is a chart for an entity, the tagging engine may be configured to read any metadata associated with the chart to determine which tags may be appropriate to associate with the chart. From the metadata, tagging engine 510 may determine that the chart is for a type of entity by reading metadata indicating that an author field is populated with the name of another particular type of entity. Tagging engine 510 may have access to other data to compare the analyzed metadata against (e.g., to identify that the author's name corresponds to Dr. Brown who is an oncologist). Other examples, of metadata that may be included in one or more fields include author, document type, creation time and date, last update time and date, upload time and data, geographic location, unique ID associated with the client or facility where the data originated, and other similar fields. The tags may be stored in association with the data (e.g., the chart) and/or may be stored independent from the data but include an identifier such that when searching tags the data may be capable of population.

Continuing with the example from above, if the data is a chart for a first type of entity, tagging engine 510 may be configured to read the content of the chart to determine which tags may be appropriate to associate with the chart. For example, this may comprise analyzing the content of the chart (i.e., individual pages) semantically to look for artifacts (e.g., keywords, phrases, and the like) in the content. These artifacts may be identified by tagging engine 510 and used to decide which tags to associate with the document. In some examples, semantic scanning may involve filtering out words (e.g., articles, such as "a" and "the"), phrases, and the like. Similar to the reading of metadata, the tags may be pre-defined, user-defined, learned, and the like. In some examples, reading metadata associated with messages may provide meaning and/or give context to the particular record of data. This meaning and/or context may assist tagging engine 510 to determine one or more tags to associate with the data. The tags may be chosen, for example, based on values of particular fields in the data, detecting a frequency of one or more words in a document or metadata and/or of a set of related words (e.g., tagging a record with "cancer" upon detecting words such as tumor, metastasize, chemotherapy, radiation, oncology, malignant, stage 3, etc.). In this manner, tagging engine 510 may also index portions of the data within one or more data stores of data store 508. In some examples, such indexing may be based in part on the selected tags.

Interoperability engine 502 also includes a reports engine 512 configured to generate one or more reports or alerts based on data. For example, reports engine 512 may generate reports when certain types of data are received or when data with certain characteristics is received. Reports engine 512 may also generate alerts. The reports and/or alerts generated by reports engine 512 may be outputted in the form of one or more communications to an administrator, an authorized user, or other similar user via a user device. Such communications can include, for example, signals, sirens, electronic notifications, popups, emails, and the like. Content of such communications may include information characterizing a performance metric, efficiency and/or outcomes; identifying concerning patterns; identifying losses of data; and the like. In some examples, the content is presented in the form of one or more documents, tables, figures, charts, graphs, and the like.

Interoperability engine 502 also includes a rules engine 514 configured to create and manage business rules, condition-response rules, alert/reports rules, data-formatting rules, data-sharing rules, transmission rules, aggregation rules, user authorization rules, and other similar rules. Such rules may be user-defined, fixed, learned by elements of the interaction system, and any combination of the foregoing.

Finally, interoperability engine 502 includes an application engine 516 configured to provide service-oriented architecture web services.

Data store 508 includes an electronic record information data store 518 ("record data store 518"), a general data store 520, an operational data store 522, an entity-based data store 524, and a streaming caching storage 526. While data store 508 is illustrated as including a fixed number of data stores and storage elements, it is understood that data store 508 can include any suitable number of data stores and storage elements, including more than illustrated or less than illustrated.

In some examples, a data query script is provided to query a first data store and/or to obtain data for populating a data store. Such script could query a data store described herein (e.g., data store 508) and/or could be used to obtain data to populate a data store described herein (e.g., data store 508). In one instance, the script is configured to be repeatedly executed, so as to repeatedly draw data from a source data store. The retrieved data can then be formatted, filtered, sorted and/or processed and then stored, presented and/or otherwise used. In this manner, the script can be used to produce streaming analytics.

In some instances, the data query script, when executed, identifies each of the data stores of interest. Identifying the data stores of interest involves identifying at least a portion of data from the data stores simultaneously and/or sequentially. For example, the script can identify corresponding data stores (e.g., or components of a single data store or multiple data stores) that pertain to one or more similar variables but that differ in one or more other variables. Once the portion of the data from the data stores is identified, a representation of the identified data can be output to one or more files (e.g., Extensible Markup Language (XML) files) and/or in one or more formats. Such outputs can then be used to access the data within one or more relational database accessible using Structured Query Language (SQL). Queries made using SQL can be made sequentially or in parallel. Results from an SQL query may be stored in a separate database or in an XML file that may be updated either in part or as a whole. The data query script may be executed periodically, in accordance with a user-defined rule, in accordance with a machine-defined or machine-learned rule, and in other suitable manner.

Within record data store 518 is retained data including electronic record information. In some examples, the information within record data store 518 is organized according to entity identifying information. Thus, record data store 518, in some examples, includes individually identifiable information. But it may also include de-identified information.

Within general data store 520 is retained data. The data may be stored in a relational database format or in any other suitable format. Thus, the data within general data store 520 may be retained in a data structure that includes one or more tables capable of accessing each other. In some examples, general data store 520 includes a subset of the information that is included in operational data store 522.

Within operational data store 522 is retained data in a relational database format. Thus, the data within operational data store 522 may be retained in a data structure that includes one or more data structures (e.g., tables) capable of accessing each other. Operational data store 522 is an example of an operational data warehouse. In operational data store 522 is joined many different types of data. In some examples, the operational data store 522 includes data pertaining to decision making as discussed herein and other data typically used by conventional business concerns.

Within entity-based data store 524 is retained data in a non-relational database format. Thus, the data within entity-based data store 524 may be retained in a structure other than tables. Such structure may be appropriate for large and complex data sets. In some examples, entity-based data store 524 (or any other data store) may be a unified system, which may include: a document-centric, schema-agnostic, structure-aware, clustered, transactional, secure, database server with built-in search and a full suite of application services. An example of such a unified system may be Marklogic. Entity-based data store 524 can support data aggregation, data organization, data indexing, data tagging and mapping to semantic standards, concept matching, concept extraction, machine learning algorithms, concept discovery, concept mining, and transformation of personal record information. In some examples, entity-based data store 524 includes data pertaining to decision making (similar to general data store 520) as discussed that is organized and accessed in a different manner. For example, the data within entity-based data store 524 may be optimized for providing and receiving information over one or more information exchanges. In some examples, entity-based data store 524 includes a subset of the information that is included in operational data store 522.

Finally, in some examples, streaming caching storage 526 is a streaming data cache data store. As discussed previously, certain components of components 410-418 may support streaming data to other components or user devices. Streaming caching storage 526 is a location where streaming data can be cached. For example, assume that component 418 is a piece of equipment operating at Location A and that a user using a computer in Location B desires to view a live of substantially live stream of outputs of the piece of equipment. Component 418 can send a portion of data to streaming caching storage 526 which can retain the portion of the data for a certain period of time (e.g., 1 day). Thus, streaming caching storage 526 is configured to cache data that can be streamed.

Diagram 500 also includes data store integrity engine 506. In some examples, data store integrity engine 506 is configured to ensure integrity of the information within data store 508. For example, data store integrity engine 506 applies one or more rules to decide whether information within all or part of data store 508 should be scrubbed, removed, or adjusted. In this manner, confidence is increased that the information within data store 508 is accurate and current.

Figure 6:
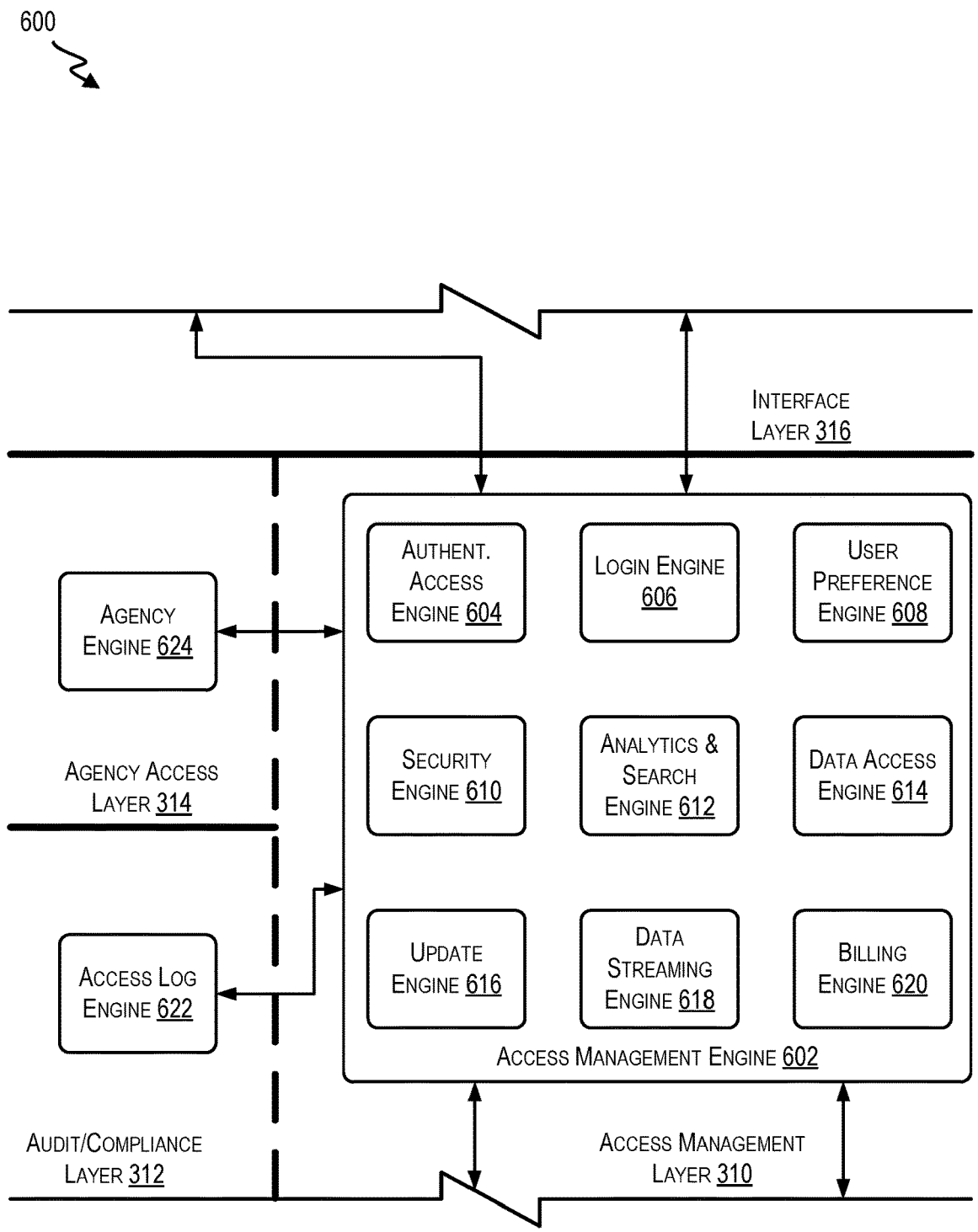
FIG. 6 is an example schematic model illustrating an aspect of the network communication model of FIG. 3 in more detail.

FIG. 6 shows a diagram 600 which depicts a portion of architecture stack 300 according to at least one example. In particular, the diagram 600 includes access management layer 310, audit/compliance layer 312, agency layer 314, and a portion of interface layer 316.

Access management layer 310, as illustrated in the diagram 600, includes an access management engine 602. Access management engine 602 is an example of access management engine 222. Generally, access management engine 602 can be configured to manage access to elements of transformative processing engine 202 by different components, applications, and user devices.

Access management engine 602 within access management layer 310 also provides functionality similar to an operating system. For example, access management engine 602 includes a plurality of engines configured to manage different aspects of interacting with elements of the interaction system. For example, a user who desires to access portions of data retained in data store 508, may do so by interacting with access management engine 602 using one or more applications (not shown). Thus, access management engine 602 includes a variety of engines to enable such interaction. The engines include, for example, an authentication access engine 604, a login engine 606, a user preference engine 608, a security engine 610, an analytics and search engine 612, a data access engine 614, an update engine 616, and a streaming data engine 618. The different engines of access management engine 602 can define routines, protocols, standards, and the like for interacting with elements of the interaction system.

Beginning first with authentication access engine 604, authentication access engine 604 evaluates the rules and conditions under which users may access elements of the interaction system; in particular, the conditions under which users may access data within data store 508.

These rules and conditions may be user-defined (e.g., by an administrator or reviewer), learned over time, and/or may be dynamically updated and/or evaluated based on characteristics of the user or the user's device attempting to access the interaction system. The rules and conditions may indicate the types of users who have particular types of access within the interaction system. The type of access may also relate to the degree to which data is identified/de-identified. In some examples, a user desiring access to data provides certain identifying information and authentication access engine 604 authenticates an identity of the user.

Login engine 606 evaluates the rules and conditions under which users are able to log in to the interaction system or access applications associated with the interaction system. These rules and conditions may be user-defined (e.g., by an administrator), learned over time, and also may be dynamically updated and/or evaluated based on characteristics of the user or the user's device attempting to access the interaction system. Thus, while authentication access engine 604 evaluates the rules to determine which users may access the interaction system, login engine 606 evaluates the particular credentials, profiles, etc. of the users. For example, login engine 606 can confirm that an entered username (e.g., and password), provided biometric data or code or identifier in a scanned tag or badge matches that in an authorized user data structure.

Login engine 606 evaluates one or more user profiles associated with each authenticated user. In some examples, a user profile includes a username, password, and other information associated with the user. For example, a user profile may indicate characteristics about the user.

User preference engine 608 evaluates the rules and conditions under which user are able to store and update one or more user preferences corresponding to access of the interaction system or access to applications associated with the interaction system. These rules and conditions may be user-defined (e.g., by the user or administrator), and may include rules for default preferences. For example, using user preference engine 608, a user may indicate a format in which the user prefers to receive outputted information, display characteristics of a graphical user interface associated with the user, and other similar user preference settings. For example, the user may indicate that certain types of reports and/or alerts are to be sent to the user.

Security engine 610 evaluates the rules and conditions for ensuring the security of access to the elements of the interaction system. In some examples, these rules and conditions are determined by administrators of the interaction system. In some examples, security engine 610 provides a plurality of computer virus protection services. These services can be called up and implemented when accessing the interaction system or accessing applications associated with the interaction system. The rules and conditions may be based on roles, based on profiles, based on domains, and any other suitable security configuration. For example, because the interaction system may include sensitive data, security engine 610 may enforce a domain-based rule that protects certain sensitive information (e.g., identifying information).

Analytics and search engine 612 evaluates the rules and conditions under which users can search for data within the interaction system and access analytics relating to the interaction system. In some examples, these rules and conditions are user-defined or learned over time in accordance with search engine optimization techniques. For example, analytics and search engine 612 is used to search within data store 508 for particular data. Analytics and search engine 612 supports any conventional searching algorithms. For example, search engine 612 can be used to search within various fields and potential field values. In some examples, search engine 612 can provide analytics, such as statistics, graphs, distributions, and/or comparative analysis pertaining to particular entities and/or characteristics. Such information may be selected by a user and presented on a user interface.

Data access engine 614 evaluates the rules and conditions under which users may operation in order to access particular data within data store 508. In some examples, these rules and conditions are user-defined or learned over time. For example, data access engine 614 may indicate the routines, subroutines, or other logic needed for an application to access certain portions of data store 508. For example, while authentication access engine 604 and login engine 606 may manage which users can access parts of the interaction system, data access engine 614 may manage how authenticated users access data within data store 508. To this end, data access engine 614 may enforce and/or evaluate certain rules managing how users access different components of the interaction system. In some examples, data access engine 614 may be used to actually access data within data store 508 (e.g., extract, download, or otherwise access). In some examples, data access engine 614 may define procedures, protocols, and the like for accessing data. The protocols and procedures for accessing data access engine 614 (like the other engines of access management engine 602) may be provided to developers in the form of a software development kit (SDK). SDKs may enable developers write applications that can effectively communicate with elements (e.g., data store 508) of the interaction system. In particular, applications that can access a portion of the data stored within active unified data layer 308.

Update engine 616 evaluates the rules and conditions for providing updates to other engines within access management engine 602, plug-ins for applications that access the interaction system, and for other similar elements of the interaction system. For example, updates may be generated at runtimes, at defined time intervals, upon request by a user, upon receiving a threshold quantity of new or changed data. Once an update is performed, an interface may be refreshed, a report may be sent indicating that the update was successful or unsuccessful, or the like.

Streaming data engine 618 defines the rules and conditions for enabling streaming of data between components and user devices of the interaction system. For example, streaming data engine 618 may enable component 414 to stream data. Streamed data may include live or substantially live audio or video feeds, results of tests, output from equipment or devices, and any other suitable type of data capable of being streamed. In some examples, the data may be streamed to other components or user devices within the network or outside the network. In order to establish a streaming transmission, streaming data engine 618 may identify a streaming destination and a streaming origin. Next, streaming data engine 618 may pair the two and enable streaming. This may include allocated bandwidth within one or more network devices associated with the interaction system. Streaming data engine 618 may also adjust the quality of the streaming data based on the availability of bandwidth. In some examples, streaming data engine 618 may receive incoming streams (and continuously present the stream or monitor for particular data (e.g., exceeding a threshold, exhibiting an above-threshold change, having a particular value)).

Within audit/compliance layer 312 is located an access log engine 622. Access log engine 622 evaluates the rules and conditions for logging access to the interaction system by users, applications, devices, and the like. Logging access includes, in some examples, logging data conventionally collected by access log engines running in similar environments. Access log engine 622 can use this data to generate and transmit reports, for example, to stakeholders of the interaction system such that they can make informed decisions regarding that is accessing the interaction system and for what purposes.

Within agency layer 314 is located an agency engine 624. Agency engine 624 evaluates the rules and conditions under which agencies can access the interaction system. For example, agencies that may use agency engine 624 include agencies to which the interaction system provides compliance, tracking, or other reporting information. For example, agency engine 624 may be used to track one or more performance indicators identified by a government agency and/or to provide report instances of defined types of events. Thus, in some examples, a government agency uses agency engine 624 to collect data pertaining to compliance of the interaction system with one or more statutes or regulations. In some examples, a university is an agency that uses agency engine 624 to collect data pertaining to one or more studies. In some examples, agency engine 624 can identify one or more entities (e.g., governmental agencies) that are to receive reports pertaining to operations or events and what types of data are to be reported to those entities. Agency engine 624 can then collect the pertinent data, potentially format and/or analyze the data, and facilitate transmission of (e.g., raw, formatted and/or analysis of) the data to the appropriate agency.

Figure 7:
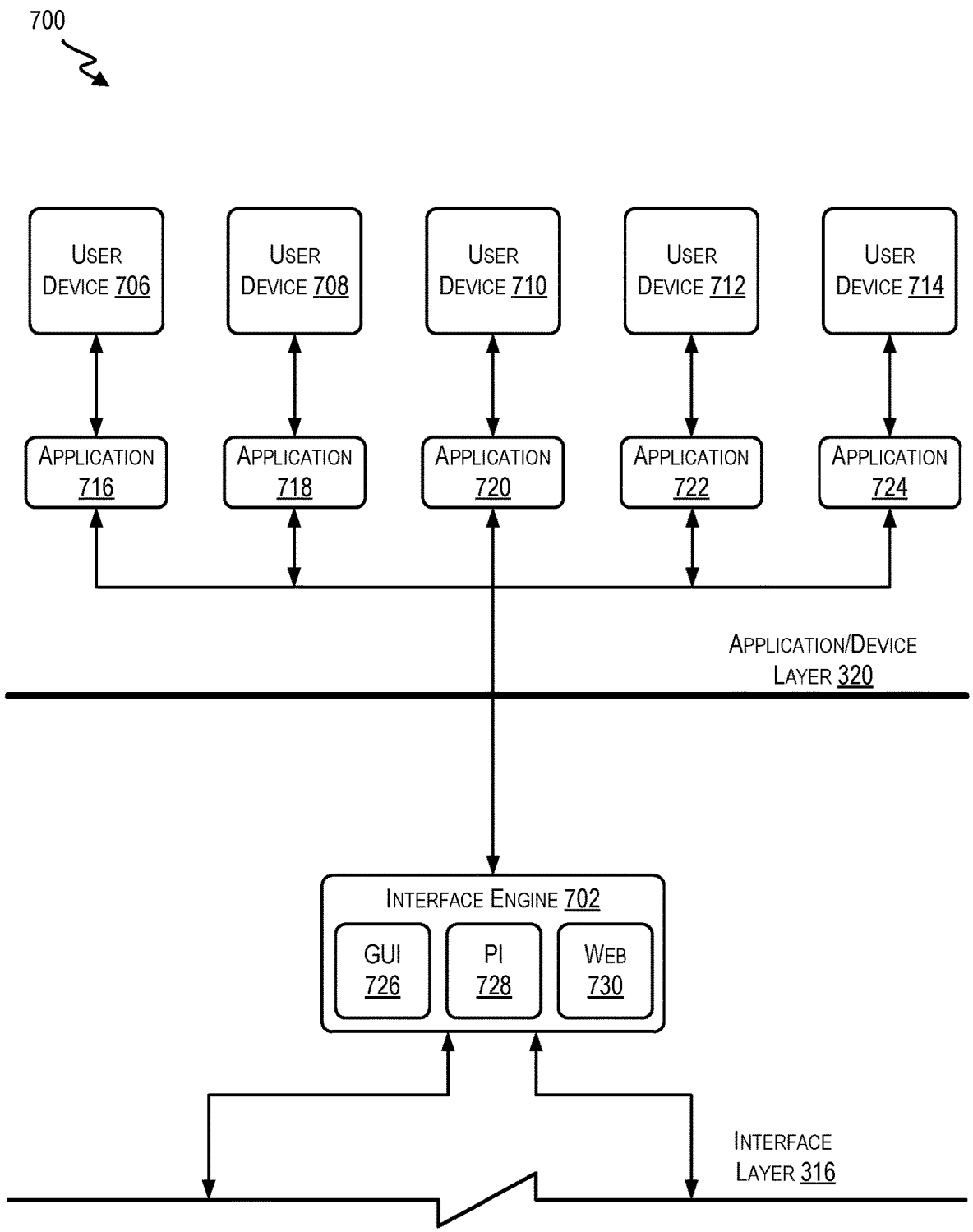
FIG. 7 is an example schematic model illustrating an aspect of the network communication model of FIG. 3 in more detail.

FIG. 7 shows a diagram 700 which depicts a portion of architecture stack 300 according to at least one example. In particular, diagram 700 includes interface layer 316, and application/device layer 320. Within interface layer 316 is located interface engine 702 (e.g., interface engine 224). Interface engine 702 is configured to generate one or more interfaces (e.g., graphical user interface 726, programmatic interface 728, and/or web interface 730) to enable data to flow to user devices 710, 712, and 714 via respective applications 720, 722, and 724. In some examples, the interfaces of interface engine 702 are embodied in hardware, software, or some combination of both. Within interface layer 316 communications and inputs directed to interacting with elements of access management layer 310 may be embodied.

Graphical user interface 726 is any suitable graphical user interface configured to interact with elements of the interaction system. Programmatic interface 728 includes an application programming interface, a programmatic user interface, and other similar interfaces for defining core functions for accessing elements of the interaction system. For example, programmatic interface 728 may specify software components in terms of their operations. Web interface 730 is any suitable web interface configured to interact with elements of the interaction system. Any of the interfaces described herein may be configured to receive user input, present dynamic presentations that depend on user input, and otherwise respond to user input. In some examples, such input may be provided via one or more input devices (e.g., a keyboard, touchscreen, joystick, mouse, microphone, devices capable of capturing inputs, and the like) operated by one or more users of user devices 706-714. Output may be provided via one or more output devices (e.g., a display or speaker).

Interface engine 702 is utilized by applications internal to the interaction system and external to the interaction system to access data. In some examples, the applications that are internal include applications that are developed for internal use by various entities associated with the interaction system. In some examples, the applications that are external to the interaction system include applications that are developed for external use by those that are not associated with the interaction system.

Generally, within application/device layer 320, applications 716-724 which communicate with other elements of architecture stack 300 using the interfaces generated by interface engine 702 are defined. This includes detailing how applications 716-724 are to interact with the interfaces generated by interface engine 702 for accessing data. For example, interacting may include accepting inputs at user devices 706-714 to access data and, in response, providing the data, prompts, or other types of interaction with one or more users of the user devices 706-714. Thus, applications 716-724 may be related to one or more of the interfaces generated by interface engine 702. For example, application 720 may be interact with a graphical user interface (whether generated by interface engine 702 or otherwise) to interact with other elements of the interaction system. Interacting may include receiving inputs at the graphical user interface via application 720, providing output data to the graphical user interface application 720, enabling interaction with other user devices, other applications, and other elements of the interaction system, and the like. For example, some of the inputs may pertain to aggregation of data. These inputs may include, for example, types of data to aggregate, aggregation parameters, filters of interested data, keywords of interested data, selections of particular data, inputs relating to presentation of the data on the graphical user interface, and the like. Providing output data may include providing the aggregated data on the graphical user interface, outputting the information to one of the other user devices 706-714 running one of the other applications 716-724.

Turning now to the details of applications 720, 722, and 724. In some examples, applications 720, 722, and 724 include a variety of different applications that can be designed for particular users and/or uses. In one example, application 720 includes dashboards, widgets, windows, icons, and the like that are customized for a particular entity. In some examples, application 720 may present different data depending on a specialty associated with the entity and protected information associated with the entity. In this manner, application 720 adapts and automatically adjusts depending on the context in which the entity is using the application. In some examples, the data indicates performance statistics for the entity, metrics relating to where the entity falls along a distribution of other similar entities, outlier instances, trends in events or actions, and the like.

Application 720 may be configured to receive input, adjust presentations, present unprompted alerts, adjust display of content, move more relevant content to the foreground, move less relevant content to the background, populate forms for the entity.

In another example, application 722 may be specific for nurses or types of nurses. In this example, application 722 may include dashboards, widgets, windows, icons, and the like that are customized to individual nurses. Similar to the example discussed above pertaining to the user, in some examples, application 724 may present different data depending on a position of the nurse. In this manner, application 722 adapts and automatically adjusts depending on the context in which the nurse is using the application. For example, the nurse may receive data, such as test results.

In some examples, application 724 may be a multi-role application for administrators and is used to manage entities constitute the population of the entities or organizations within the interaction system. Similar to the other examples discussed, in some examples, application 724 may present different data depending on a role of the user who is using application 724. In this manner, application 724 adapts and automatically adjusts depending on characteristics of the user who is using application 724. In this manner, application 724 can provide different data depending on the role of the user. For example, whether data presented includes identifiable or de-identified information may depend on a position of the user.

In some examples, application 724 may be a business intelligence application. In this example, application 724 is used to display business information generated by components of the interaction system. This business information can be used for operations, planning, and forecasting. Such business information may include data because such data may impact operations, planning, forecasting, and the like. Accordingly, application 724 may present de-identified information in the form of one or more metrics, indicators, or the like as they pertain to business intelligence.

Applications 716 and 718 shown in connection with interface engine 702 are applications developed by third-parties. In some examples, such applications include any suitable application that benefits from accessing data. The interaction system may include data pertaining to hundreds of thousands of entities. Having data pertaining to so many entities presents security concerns. For example, much of the data may be identifying data. Accordingly, data that may be accessed by applications 716 and 718 may be limited. In some examples, an entity of the interaction system may use one of applications 716, 718 to access his or her own data. In this example, the identity of the entity may be verified in accordance with techniques described herein.

User devices 706-714 are any suitable user devices capable of running applications 716-724. User devices 706-714 are examples of the user device 228. In some examples, the user devices include: mobile phones, tablet computers, laptop computers, wearable mobile devices, desktop computers, set-top boxes, pagers, and other similar user devices. In some examples, at least some of user devices 706-714 are the same devices as at least some of the one or more components 410-418. In some examples, user devices 706-714 may include complementary layers to application/device layer 320 and/or receiving layer 302. For example, user devices 706-714 may include a transmission layer, a generation layer, and/or a receiving layer to communicate data at application/device layer 320 and at receiving layer 302.

Figure 8:
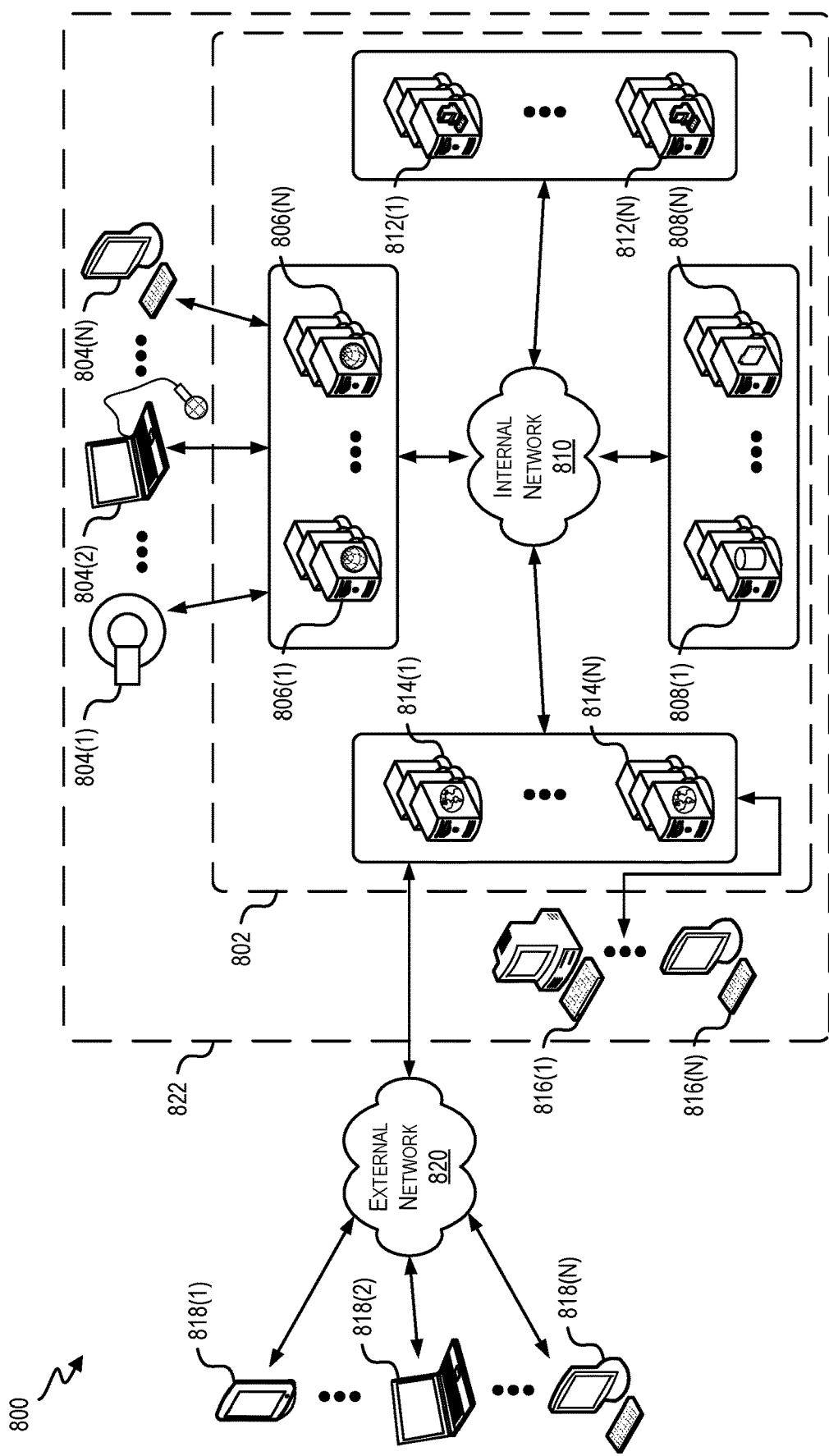
FIG. 8 is an example schematic architecture illustrating an interaction system in which techniques relating to processing delay predictions based on queue assessments may be implemented, according to at least one example.

Turning now to FIG. 8, an interaction system 800 is shown according to at least one example. Interaction system 800 includes an internal organization 822 including a transformative processing engine 802. The transformative processing engine 802 is an example of transformative processing engine 202 previously discussed. Interaction system 800 is illustrated as an example configuration for implementing the techniques described herein. In particular, a configuration of elements as illustrated in FIG. 8, at least in some examples, communicates according to the layers of architecture stack 300. For example, internal organization 822 includes generation components 804(1), 804(2), and 804(N) which provide data to aggregation servers 806(1)-806(N).

Generation components 804(1), 804(2), and 804(N) operate in accordance with receiving layer 302. In some examples, generation component 804(1) is a piece of equipment, generation component 804(2) is computer with a data collection device, a type of lab system, and generation component 804(N) is a terminal. Aggregation servers 806(1)-806(N) operate in accordance with aggregation layer 304. Aggregation servers 806(1)-806(N) share data with data storage servers 808(1)-808(N) via one or more internal network(s) 810. In some examples, internal network 810 is any suitable network capable of handling transmission of data. For example, internal network 810 may be any suitable combination of wired or wireless networks.

In some examples, internal network 810 may include one or more secure networks. Data storage servers 808(1)-808(N) are configured to store data in accordance with active unified data layer 308. Data storage servers 808(1)-808(N) include database servers, file storage servers, and other similar data storage servers.

Access management servers 812(1)-812(N) manage access to the data retained in the data storage servers 808(1)-808(N). Access management servers 812(1)-812(N) communicate with the other elements of interaction system 800 via internal network 810 and in accordance with access management layer 310.

Interface servers 814(1)-814(N) provide one or more interfaces applications to interact with the other elements of interaction system 800. Interface servers 814(1)-814(N) provide the one or more interfaces and communicate with the other elements of interaction system 800 via internal network 810 and in accordance with interface layer 316. The interfaces generated by the interface servers 814(1)-814(N) can be used by internal user devices 816(1)-816(N) and external user devices 818(1), 818(2), and 818(N) to interact with elements of interaction system 800.

Internal user devices 816(1)-816(N) are examples of user devices 706-714. In some examples, internal user devices 816(1)-816(N) run applications via the interfaces generated by interface servers 814(1)-814(N). As an additional example, external user devices 818(1), 818(2), and 818(N) can run applications developed by third parties that access the other elements of interaction system 800 via the interfaces generated by interface servers 814(1)-814(N).

External user devices 818(1), 818(2), and 818(N) access the interfaces via external network 820. In some examples, external network 820 is an unsecured network such as the Internet. External user devices 818(1), 818(2), and 818(N) are examples of user devices 706-714. External user device 818(1) is a mobile device. In some examples, the mobile device may be configured to run an application to access interaction system 800. Similarly, the other external user devices 818(2)-818(N) run applications that enable them to access interaction system 800. While interaction system 800 is shown as implemented using discrete servers, it is understood that it may be implemented using virtual computing resources and/or in a web-based environment.

The systems, environments, devices, components, models, and the like of FIGS. 1-8 may be used to implement particular techniques as described herein. In one example, examples relate to generating and using predictions of delays for usage of medical resources, such as delays for being seen by a professional at an specialized facility (e.g., an emergency department or Emergency Room). For example, a central server can manage one or more queues for each of a plurality of resources. Queue elements can correspond to requests for performing a task, which can include a task such as using or accessing a medical resource (e.g., being seen or treated by a physician, to have a test initiated, and so on). Queue elements can remain in a corresponding queue until processing of the task is initiated (e.g., a patient (e.g., a dependent user) is seen by a physician, nurse or technician (e.g., professional medical users) and/or a dependent user is assigned to a room). Thus, a size of a queue and a type of tasks in the queue may be used to predict what delay (e.g., wait time) will be experienced by a queue item newly added to (or potentially being added to) the queue. In addition to one or more characteristics of a current queue, the prediction may also be based on historical time-based changes to the queue, types of current resource usages (e.g., types of events currently being treated in an specialized facility), types of tasks represented in the current queue, and/or recent requests received A predicted delay may be generated in response to receiving a communication from a user device that corresponds to a predicted processing delay. The request can identify or otherwise correspond to a resource type and/or location, which can be used to identify at least one queue that corresponds to the request. In some instances, the central server identifies one or more resource locations based on a location of the user device and/or a location identified in the request, and/or the central server identifies one or more resource locations based on a type of resource based on a record, sensor reading and/or communication history associated with the user device (and/or associated user). A size of the queue and/or types of tasks in the queue can be evaluated to estimate a current delay for a new task. The delay can be transmitted to the user device.

The central server can also use the request communication to trigger one or more preparatory actions, such as retrieving one or more (e.g., electronic and/or physical records) that correspond to the user and/or facilitating physical relocation of one or more personnel and/or equipment resources (e.g., from a first part of an institution to a second part of the institution). The central server may predict a time at which a new queue element is to be added to the queue based on estimating a commute time between a location of a user device and a resource location.

As one particular example, an application can be installed on a user device that receives inputs indicating that a user is requesting information about a wait time at an Emergency Department (e.g., generally or a specific Emergency Department). In response to detecting an input, execution of the application can cause the user device to transmit a communication to a remote server, which may reside (for example) in the cloud or at a facility associated with an Emergency Department. The server can retrieve a queue associated with a resource corresponding to the request. In some instances, a single queue includes all pending requests for a given Emergency Department. In some instances, multiple queues (e.g., corresponding to different treatment types, professional users and/or spatial areas) are associated with a single specialized department. Based on the queue length and/or types of service requests represented by the queue elements, the server can estimate a current wait time. In some instances, the estimated wait time further depends on one or more other factors, such as any identified upcoming shift changes, common time-of-day changes in wait time, and so on. The estimated wait time can then be transmitted from the server to the user device, which can display the wait time. In some instances, the server generates a queue element based on the request and adds it to the queue, though the queue element may indicate that the service request is not finalized.

A wait time for being serviced by an specialized department or other resource can be useful to inform a dependent user (e.g., who may decide to go to another facility, stress an urgency of being seen, or seek alternative treatment). In some examples, a wait time may be presented at a user device via an application (e.g., in response to receiving a request from the user for the wait time or detecting a health trigger). In this case, a location of the user may be estimated (e.g., as a location of the user device or a location identified via input), such that a predicted arrival time can be generated for each of one or more facilities, specialized departments or other resource usages. A wait time at the predicted arrival time can then be generated based on factors such as, e.g., which services are being provided currently, a number of requests having been recently received and/or conditions of those in a waiting queue at the specialized department.

One technique for generating a wait time is to identify and/or assess time periods between arrival and acceptance times of dependent users to whom were recently attended. Another approach is to consider what particular conditions, evaluations and/or treatments are being (or are likely to be) experienced or provided with respect to dependent users currently being treated or waiting for treatment. For example, it may be estimated that a dependent user room will be occupied, on average, for 4 hours by a dependent user experiencing chest pains. The predictive assessment can include non-linear factors. For example, non-linear factors may arise due to availability of multiple resources and overlap (or non-overlap) in the use of the same types of resources for different treatments, evaluations or conditions.

For example, an input may correspond to a request for a wait time, an indication that the user is leaving to travel to the Department, or a presentation of an alarm or alarm condition indicating a recommendation that the user go to the specialized department. A notification is then sent to an specialized department that includes an instruction to prepare for the person's arrival by (for example) pulling paper or electronic records of the person, predicting a condition corresponding to the visit, locating or request equipment (or other resources) likely to be needed for evaluation or treatment of the person, and/or transmitting one or more data objects (e.g., registration forms) to the user device that request entry (from the person or nearby person) to register the person for the specialized department.

Figure 9:
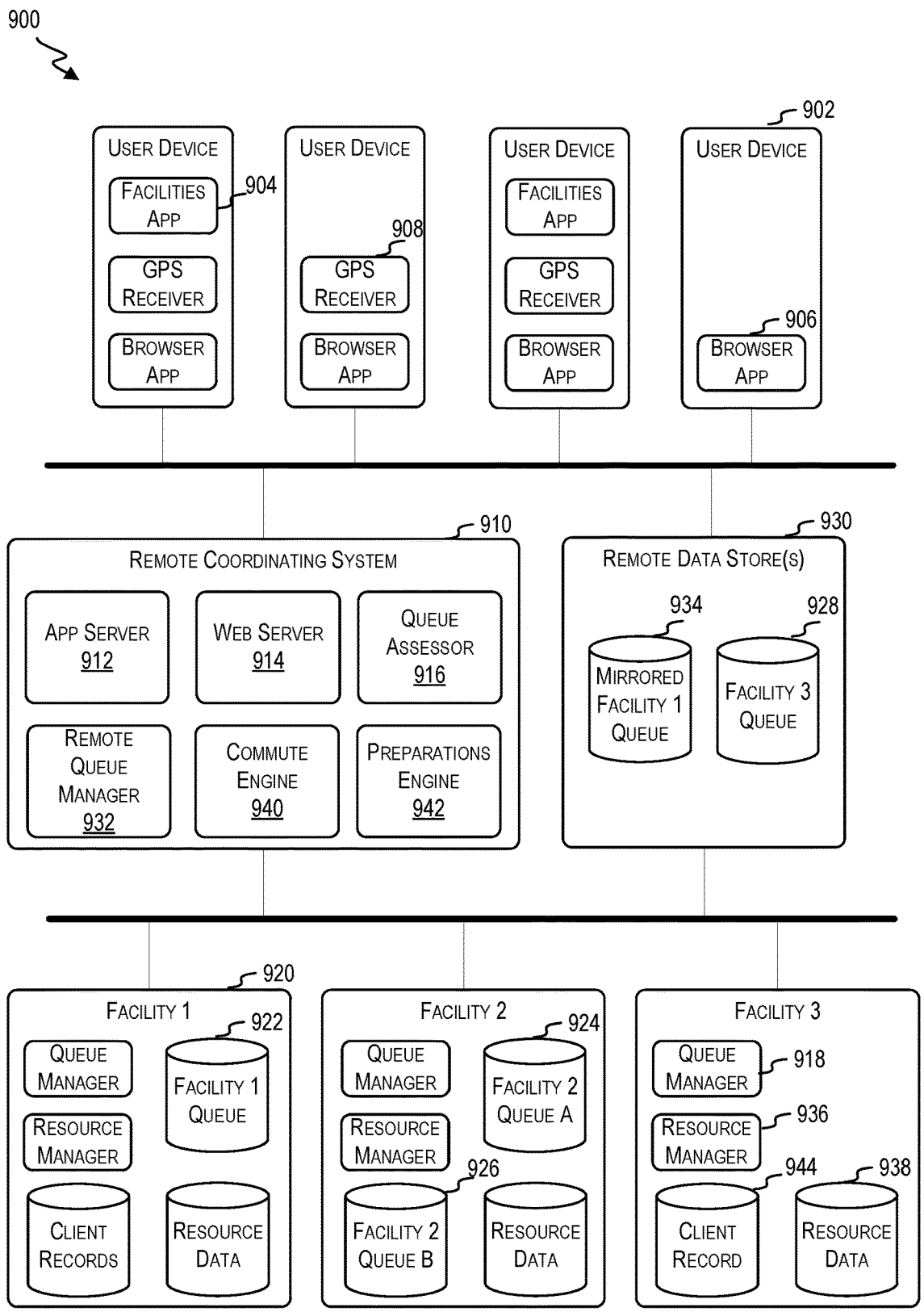
FIG. 9 is an example block diagram of an example of a network 900 in which techniques relating to processing delay predictions based on queue assessments may be implemented, according to at least one example.

FIG. 9 shows a block diagram of an example of a network 900 according to an example. Network 900 includes multiple user devices 902, each of which can include an electronic device such as a desktop computer, laptop, tablet, or smart phone. User device 902 can include one or more applications that can support a user interface and/or automated-detection process. Exemplary applications include a facilities application 904 and a browser application 906. Facilities application 904 can include (for example) an application associated with one or more facilities, such that data detected at a user device can be processed and/or communicated to one or more facilities and/or the converse. Browser application 906 can, for example, support an implementation at the user device of a browser, such as Explorer®, Chrome®, Safari® or Firefox®. The browser can be used to access a webpage associated with one or more facilities, such that data detected at a user device can be processed and/or communicated to one or more facilities and/or the converse.

The user interface and/or detection process can detect data (e.g., input data or sensor data) that corresponds to a request for a wait time at a specialized facility. In some instances, the request is explicitly conveyed, such as by a selection of a request link. In some instances, the request is implied. For example various events (e.g., detecting an above-threshold change in a monitored physiological factor or detecting a request for directions to a facility) may trigger a waiting-time request.

In some instances, an application can determine for which facility a waiting time is being requested. For example, an interface can identify multiple facilities and detect an input corresponding to a selection of a single facility. In some instances, an application can collect data to be used in a selection of a facility. For example, an interface can receive input corresponding to an identification of an address. As another example, a location can be automatically detected based on one or more signals received by a receiver at the user device, such as a GPS receiver 908 (e.g., such that geographic coordinates can be determined). As illustrated in FIG. 9, various user devices 902 can include various components. For example, a user device may, or may not, include GPS receiver 908 and/or facilities app 904.

In response to detecting data corresponding to a request for a wait time, facilities application 904 and/or browser application 906 can generate one or more communications and transmit the one or more communications to a remote system 910. The one or more communications can identify (for example) a user device, a user, a location, a particular facility and/or an indication that a wait time is being requested.

Remote coordinating system 910 can include an application server 912 that can communicate with a user device 902 via a facilities application 904 and/or a web server 914 that can communicate with a user device 902 via a browser application 906 (e.g., via a web site hosted at web server 914)

Remote coordinating system 910 can include a queue assessor 916 that accesses and assesses one or more queues corresponding to one or more facilities to identify a predicted wait time to include in a response to a user-device request. In some instances, queue assessor 916 requests queue data from a queue manager 918 each of one or more facilities 920. Queue manager 918 can manage one or more facility queues stored locally at the facility or remotely and corresponding to one or more facility resources. For example, at Facility 1, queue manager 918 can manage a single facility queue 922 stored locally at the facility and corresponding to each of one or more resources at the facility. For example, elements in the queue may identify one or more usage types and/or resources for corresponding to a requested service. To illustrate, facility queue 922 may include a queue element corresponding to each service request for an specialized department in the facility, irrespective of what type of condition is being experienced and/or what type of service is to be provided. As another example, at Facility 2, queue manager 918 can manage multiple facility queues 924, 926, which can correspond to (for example) different resources (e.g., professional users, equipment, or areas) and/or types of services (e.g., conditions for which service is requested). For example, Facility 2 Queue A 924 can correspond to requests that likely require an operating room, while Facility 2 Queue B 926 can correspond to other requests. As yet another example, at Facility 3, queue manager 918 can facilitate managing a remote facility queue 928 stored at a remote data store 930. For example, queue manager 918 at Facility 3 may send communications to a remote queue manager 932 to request that particular updates be implemented with respect to the queue.

Remote data store 930 can also include one or more mirrored facility queues, which may mirror a facility queue stored and managed locally at a facility. For example, periodically, queue manager 918 can transmit a communication to remote queue manager 932 that identifies any queue changes having been implemented and/or a current queue, such that a mirrored queue (e.g., mirrored Facility 1 Queue 934) can be updated accordingly.

Managing a queue can include, for example, generating queue elements, adding queue elements to a queue and/or removing queue elements from a queue. A queue element can include information corresponding to a service request, such as (for example) identifying information of a user (e.g., a name, social security number, address, phone number, age and/or sex), a condition being experienced by a user for which treatment is sought, a type of treatment being sought, one or more resources to be used in the treatment, and/or an arrival time. For example, an agent or device at a facility may detect that a person is requesting a service at the facility (e.g., and has arrived at the facility) and collect information corresponding to the request. A queue element can be generated to include the information, and added to a queue. When one or more appropriate resources are available for provision of the service and the queue element is of an order to permit such service, an agent or device can remove the queue element from the queue. In some instances, service is provided in an order that corresponds to an order of queue elements. In some instances, an order in which queue elements are handled depends on a severity of conditions being treated. In some instances, an order in which queue elements are handled depends on a request-specific assessment as to whether each resource required to begin and/or complete the service are available.

A resource manager 936 can track a use and/or availability of each of one or more resources associated with a facility. Resource manager 936 can also or alternatively assign one or more resources to particular queue elements. Resource manager 936 can receive one or more inputs and/or detect one or more sensor readings that indicate whether a given resource is in use and/or has been assigned to a particular queue element. Resource manager 936 can update a resource data store 938 to reflect changes to and/or current usage and/or assignment statuses. Queue manager 918 can then query resource data store 938 to determine whether one or more resources are available for processing of a queue element.

For example, in an specialized department setting, one resource to be used for handling of each queue element can include a dependent user room. Some (but not all) queue elements can use other resources, such as particular types of technicians, operating room, and/or equipment (e.g., an ultrasound). Queue manager 918 can repeatedly assess, for particular queue elements (e.g., of lowest order), whether each required resource (e.g., to perform a first part of a service or all of the service) is available, based on data at resource data store 938. Queue manager 918 can then detect one or more queue elements for which each required resource is available and determine which, if any, queue elements are to be moved to a processed status and/or removed from a queue (e.g., based on an order of queue elements in the queue, severity of conditions associated with queue elements, and so on).

In some instances, queue assessor 916 estimates a current wait time associated with a facility queue. The current wait time may correspond to a time period for which it is estimated that a queue element newly added to the queue will wait until it is moved to a processed status and/or removed from the queue. In some instances, one or more particular details may influence this estimation. For example, a delay may be estimated to depend on a severity of a condition. The detail(s) may influence which queue to which a queue would be added and/or a prioritization factor of the queue element, which may change an estimated wait time.

In some instances, queue assessor 916 predicts a future wait time associated with a facility queue, such as a wait time that is predicted for a time at which a user may arrive at the facility. The prediction may depend on what time it is predicted that a user will arrive at the facility. The predicted arrival time may be, for example, identified in a communication from a user device and/or estimated based on a location of a user device. For example, a commute engine 940 can estimate a commute time between a location of a user device and a location of each of one or more facilities. The commute time may be estimated based on one or more roads, streets or highways connecting the user-device location to the facility location and/or traffic conditions on the one or more roads, streets or highways. A predicted arrival time may then be defined as a current time plus an estimated commute time (e.g., a shortest estimated commute time if multiple facilities are consider). In some instances, an additional fixed delay can be added as a time estimated for initiating the commute. A predicted wait time at the predicted arrival time can be generated based on one or more current queues and/or historical changes to the queue(s) based on time of day and/or shift changes.

Queue manager 916 can then generate and transmit a communication to user device 902 that includes a current and/or predicted wait time for each of one or more facilities. Each facility may be identified (for example) by name and/or location (e.g., address). User device 902 can present this information via a user interface supported (for example) by facilities application 904 of browser application 906. In some instances, the user interface includes an input component configured to receive an indication as to whether the user intends to visit a facility and/or as to which facility will be visited.

Upon receiving a wait-time request or indication that a user will visit a facility, a preparations engine 942 can coordinate one or more preparations at a facility. A preparation can include (for example) locating one or more resources for handling the request, facilitating any appropriate moves of resources to a location for handling the request, retrieving (e.g., electronic or paper) client records 944 stored locally at the facility or remotely and corresponding to the user, and/or sending one or more communications to the user device to request particular information (e.g., identifying information, insurance information, information corresponding to a present condition and/or billing information). A local or remote client record may then be updated with the information. In some instances, queue manager 918 notes the request and/or indication of intent to arrive at the facility and modifies subsequent waiting-time predictions based on the anticipated addition to the queue.

Figure 10:
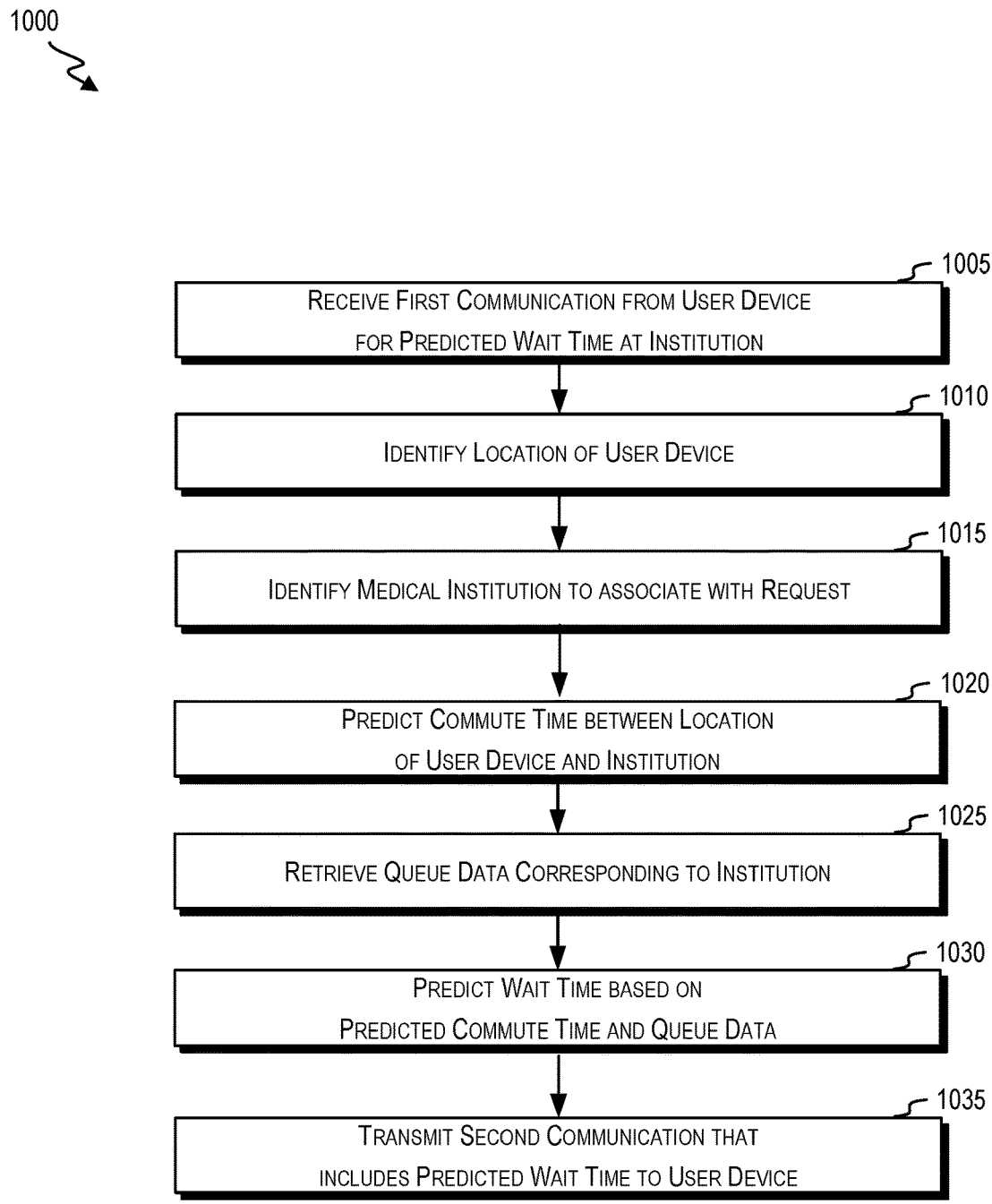
FIG. 10 is an example flow diagram illustrating a process for implementing techniques relating to processing delay predictions based on queue assessments, according to at least one example.

FIG. 10 shows a process 1000 for communicating wait times according to an example. Process 1000 begins at block

1005 where a first communication is received from a user device that corresponds to a request for a predicted wait time at a facility. The first communication may be generated via execution of an application on the user device. For example, execution of an application can cause an interface to be displayed that receives an input corresponding to the request, which then triggers the generation and transmission of the first communication.

The first communication can correspond to an explicit or implicit request for the predicted wait time. An implicit request may include a request or indication corresponding to another event where a response to such indication or request (in accordance with a rule) will include a predicted wait time. For example, the first communication may indicate that a event is occurring or that a dependent user is requesting directions to a specialized facility.

At block 1010, a location of the user device is identified based on the first communication. For example, the first communication can include data or metadata that identifies the location.

At block 1015, a facility (e.g., a medical institution such as a hospital, emergency room, Urgent Care, physician's office and/or other medical treatment facility) is identified to associate with the request. The facility can be identified based on the location of the user device. In some instances, the first communication identifies or corresponds to a particular facility (e.g., a specialized facility). In some instances, a server having received the first communication can identify the facility by identifying a facility that is close (or closest) to a user device in terms or commuting time or distance or by identifying a facility predicted to have a below-threshold or shortest time for a user to be seen based on a predicted commute time and predicted wait time.

At block 1020, a commute time between the location of the user device and a location of the facility is predicted. The prediction can be based (for example) on a distance between the location and/or traffic between the locations.

At block 1025, queue data corresponding to the facility is retrieved. The queue data can include one or more queue elements and/or a characteristic of the one or more queue elements. Each queue element of the one or more queue elements can be associated with data characterizing a medical instance for which service at the facility is being requested; For example, each queue element can correspond to a dependent user requesting to be attended to at an specialized department of a hospital. Each queue element can thus include or correspond to information identifying a particular dependent user (e.g., by name, social security number, address, phone number and/or other identifier), a particular condition (e.g., a particular illness, symptom, trauma, or past event), and/or requested type of treatment (e.g., to treat a bullet wound, extreme nausea, a severed appendage, chest pains, etc.; or an ultrasound, surgery, particular medication, etc.). A characteristic of the one or more queue elements can include (for example) a number of the one or more queue elements and/or a time for which a given queue element has been in the queue.

In some instances, a data store stores queue data for multiple facilities, and block 1025 includes querying the data store with an identifier of the specialized facility. In some instances, each of multiple data stores is associated with a particular facility, such that information retrieved from a given data store corresponds the facility.

At block 1030, a wait time is predicted based on the predicted commute time and the queue data. The commute data can be used to predict an arrival time (e.g., as a sum of a current time and the commute time, with potentially an additional duration for initiating a commute), and the queue data can be used to predict the wait time at the arrival time. For example, a change in a characteristic of one or more queue elements (e.g., a number of the elements or time for which an element has been in the queue) can be detected, and a characteristic can be extrapolated to identify a predicted value (which can include or can be used to predict a wait time) at a predicted arrival time. As another example, a change or trend of a queue can be determined based on historical data (e.g., corresponding to a time period and/or day), and the change or trend can be evaluated with respect to current queue data. The predicted wait time can include (for example) a single time and/or a range of times.

At block 1035, a second communication that includes the predicted wait time is transmitted to the user device. An application on the user device may then display the predicted wait time.

Figure 11:
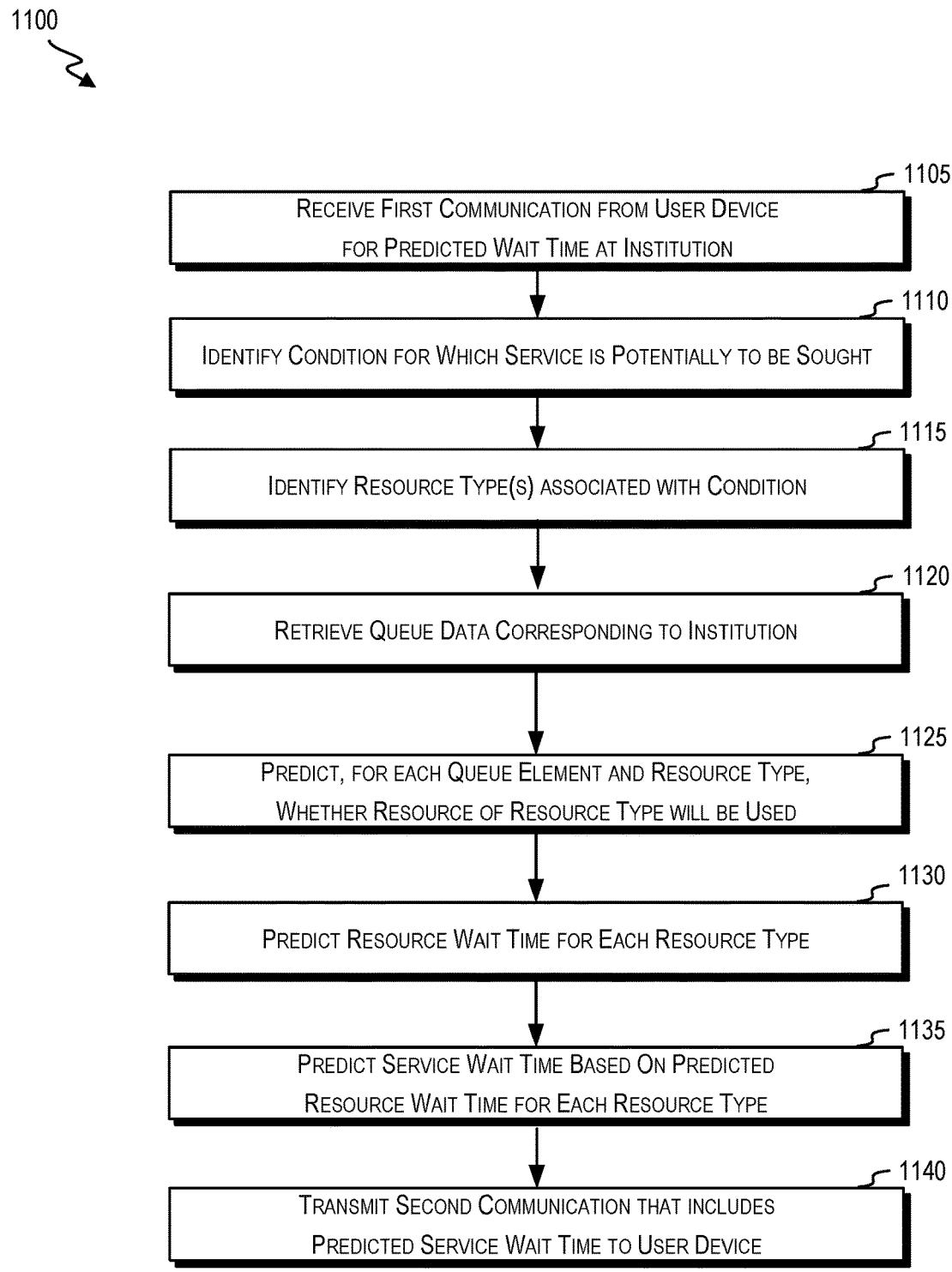
FIG. 11 is an example flow diagram illustrating a process for implementing techniques relating to processing delay predictions based on queue assessments, according to at least one example.

FIG. 11 shows a process 1100 for communicating wait times according to an example. Process 1100 begins at block 1105 where a first communication is received from a user device that corresponds to a request for a predicted wait time at a facility. The first communication may be generated via execution of an application on the user device. For example, execution of an application can cause an interface to be displayed that receives an input corresponding to the request, which then triggers the generation and transmission of the first communication.

At block 1110, a condition for which service is potentially to be sought is identified. The condition can be identified based on data or metadata in the first communication. In some instances, the data or metadata may identify the condition. In some instances, the data or metadata may identify one or more symptoms or events corresponding to the condition. In some instances, the data or metadata may identify a user or user device, which can be used to retrieve a client record that identifies the condition.

At block 1115, one or more types of resource are identified that are associated with the condition. The resource(s) may be identified based on (for example) looking up the condition in a look-up table. The resource(s) may include, for example, one or more types of professional users, one or more types of medical equipment, one or more types of medical supplies, one or more spaces (e.g., operating or dependent user room) and/or one or more types of medications.

At block 1120, queue data corresponding to the facility is retrieved. The queue data can include one or more queue elements. Each queue element of the one or more queue elements can be associated with data characterizing a medical instance for which service at the facility is being requested; For example, each queue element can correspond to a dependent user requesting to be attended to at an specialized department of a hospital. Each queue element can thus include or correspond to information identifying a particular dependent user (e.g., by name, social security number, address, phone number and/or other identifier), a particular condition (e.g., a particular illness, symptom, trauma, or past event), and/or requested type of treatment (e.g., to treat a bullet wound, extreme nausea, a severed appendage, chest pains, etc.; or an ultrasound, surgery, particular medication, etc.).

At block 1125, for each resource type of the one or more resources types and for each queue element of the plurality of queue elements, it is predicted whether a service request characterized by the queue element will use a resource of the resource type. For example, a queue element may identify a condition, symptom or event that can be used to look-up or otherwise identify one or more resources to be used (e.g., an EKG machine may be used when a dependent user reports experiencing chest pains). As another example, a queue element may identify the one or more resource types. As yet another example, an automated analysis can be performed to determine which types of resources were used during past visits corresponding to a same or similar dependent user, condition, and/or symptom.

At block 1130, a predicted resource wait time is generated for each resource type of the one or more resources types. The resource wait can be predicted based on predictions as the service requests characterized by the queue elements will use a resource of the resource type. For example, the more queue elements for which it is estimated that a resource of the resource type will be used, the longer the predicted resource wait time may be. The predicted resource wait time need not, however, linearly depend on a number of queue elements for which it is estimated that a resource of the resource type will be used. For example, a non-linear relationship may exist due to an existence of multiple resources of the type at a facility and/or due to variabilities in potential uses of a resource introduced because of differences across queue elements of dependent user conditions, symptoms, etc.

At block 1135, a service wait time is predicted based on the predicted resource wait time for each of the one or more resources types. For example, a service wait time may be or may depend on a longest predicted resource wait time across the one or more resource types.

At block 1140, a second communication that includes the predicted service wait time. An application on the user device may then display the predicted wait time.

Figure 12:
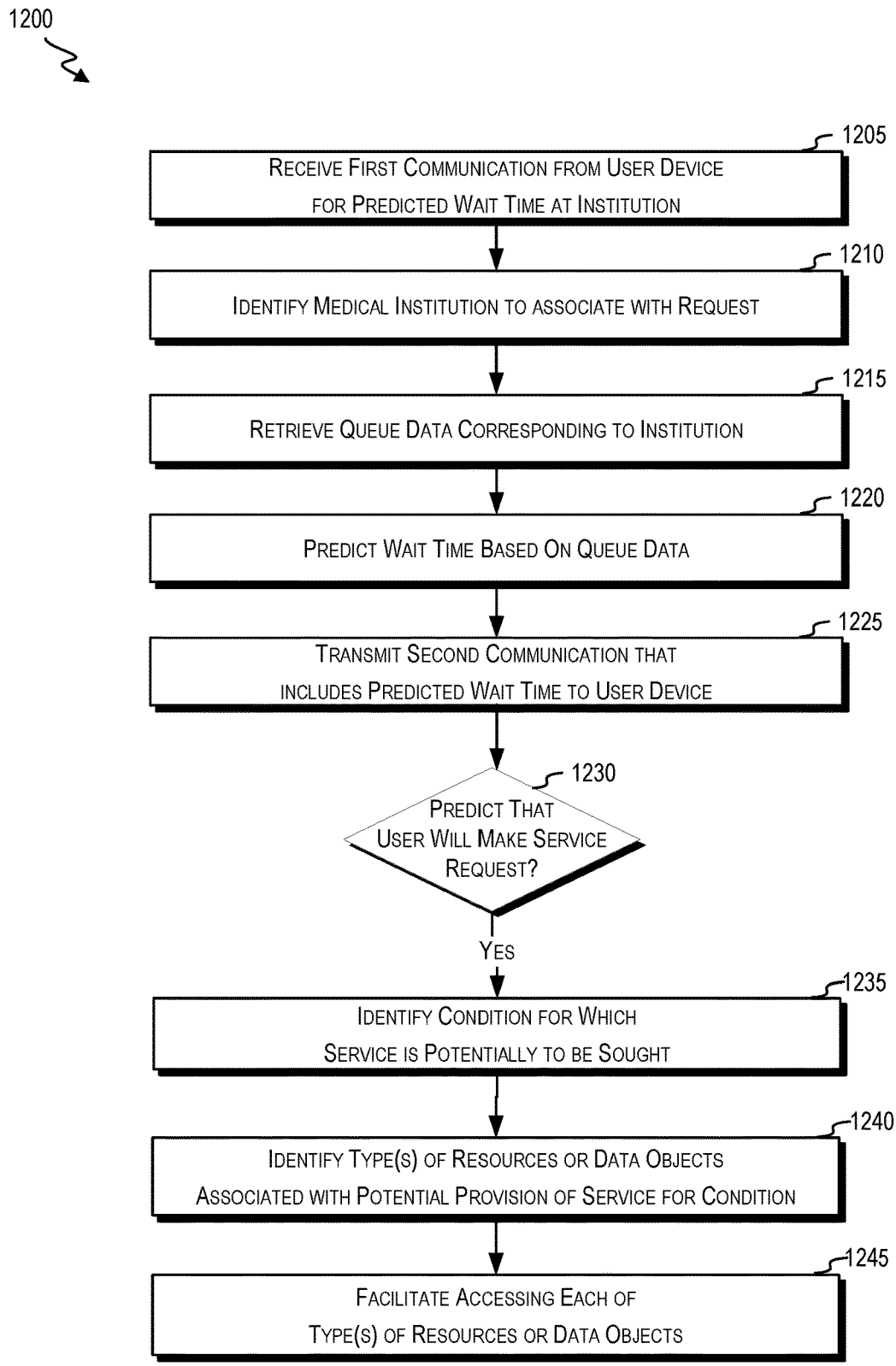
FIG. 12 is an example flow diagram illustrating a process for implementing techniques relating to processing delay predictions based on queue assessments, according to at least one example.

FIG. 12 shows a process 1200 for facilitating resource access according to an example. Process 1200 begins at block 1205 where a first communication is received from a user device that corresponds to a request for a predicted wait time at a facility. The first communication may be generated via execution of an application on the user device. For example, execution of an application can cause an interface to be displayed that receives an input corresponding to the request, which then triggers the generation and transmission of the first communication.

The first communication can correspond to an explicit or implicit request for the predicted wait time. An implicit request may include a request or indication corresponding to another event where a response to such indication or request (in accordance with a rule) will include a predicted wait time. For example, the first communication may indicate that a medical event is occurring or that a dependent user is requesting directions to a medical facility.

At block 1210, a facility (e.g., a medical institution) is identified to associate with the request. The facility can be identified based on, for example, a location of the user device. The facility can be identified based on a client record (e.g., stored at a remote system) that associates a dependent user with identifying information corresponding to the user device with a particular facility (e.g., to indicate that the dependent user previously was seen at the facility). The facility can be identified based on input detected at the user device and communicated in association with or as part of the first communication.

At block 1215, queue data corresponding to the facility is retrieved. The queue data can include one or more queue elements and/or a characteristic of the one or more queue elements. Each queue element of the one or more queue elements can be associated with data characterizing a medical instance for which service at the facility is being requested; For example, each queue element can correspond to a dependent user requesting to be attended to at an specialized department of a hospital. Each queue element can thus include or correspond to information identifying a particular dependent user (e.g., by name, social security number, address, phone number and/or other identifier), a particular condition (e.g., a particular illness, symptom, trauma, or past event), and/or requested type of treatment (e.g., to treat a bullet wound, extreme nausea, a severed appendage, chest pains, etc.; or an ultrasound, surgery, particular medication, etc.). A characteristic of the one or more queue elements can include (for example) a number of the one or more queue elements and/or a time for which a given queue element has been in the queue.

At block 1220, a wait time is predicted based on the queue data. The predicted wait time may further be based on one or more other factors, such as a predicted commute time, an anticipated schedule change of one or more human resources, a status of one or more dependent users currently using a resource, and so on.

At block 1225, a second communication that includes the predicted wait time is transmitted to the user device. An application on the user device may then display the predicted wait time.

At block 1230, it is predicted whether a user associated with the user device will request a service at the facility. The prediction may be based on, for example, whether and/or what input has been detected at the user device (e.g., and communicated by the user device) indicating an intention to go to the facility (or not to go to the facility). The input may correspond (for example) to a selection of one institution amongst a plurality of institutions, an Accept/Decline option, an initiation and/or completion of an electronic registration process. In some instances, the prediction can be based on sensor or receiver data collected at the device. For example, it may be predicted that the user will request a service at the facility if an accelerometer or GPS indicates that the user device is moving (e.g., at an above-threshold velocity or acceleration and/or in a direction corresponding to the institution.

When it is predicted that a user associated with the user device will request a service at the facility, process 1200 proceeds to block 1235 where a condition for which service is potentially to be sought is identified. The condition can be identified based on data or metadata in the first communication. In some instances, the data or metadata may identify the condition. In some instances, the data or metadata may identify one or more symptoms or events corresponding to the condition. In some instances, the data or metadata may identify a user or user device, which can be used to retrieve a client record that identifies the condition.

At block 1240, one or more types of resources or data objects are identified that are associated with a potential provision of service for the condition. Resource(s) and/or data object(s) may be identified based on (for example) looking up the condition in a look-up table and/or assessing a policy of the facility. For example, a policy may indicate that treatment of any condition requires a patient-room resource and a patient-information record including identifying and/or health information. The resource(s) may include, for example, one or more types of medical professionals, one or more types of medical equipment, one or more types of medical supplies, one or more spaces (e.g., operating or dependent user room) and/or one or more types of medications. The data object(s) can include one or more electronic health records.

At block 1245, access to each of the one or more types of resources or data objects is facilitated. As one example, a resource may be located in at a location different than where it would be needed for treating or testing the user, and a request can then be sent to the resource (e.g., a human resource) or to an agent to relocate the resource. As another example, a resource may require a configuration, sterilizing or other preparation process prior to being used, and an instruction may be sent to the resource or to an agent to initiate the process. As yet another example, an instruction can be electronically transmitted to an agent (e.g., via an agent device) to retrieve one or more physical medical records corresponding to a user/dependent user from (for example) a file room. As still another example, an electronic health record corresponding to a user/dependent user can be retrieved from a data store and transmitted to a device, such as a physician device.

Specific details are given in the above description to provide a thorough understanding of the examples. However, it is understood that the examples may be practiced without these specific details. For example, circuits may be shown in block diagrams in order not to obscure the examples in unnecessary detail. In other instances, well-known circuits, processes, algorithms, structures, and techniques may be shown without unnecessary detail in order to avoid obscuring the examples.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the examples may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, examples may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A computer-implemented method comprising:
    receiving, at a server, a first communication from a device of an incoming patient, wherein the first communication corresponds to a request for a predicted wait time at at least one medical facility;
    identifying, based on the first communication, a location of the device;
    identifying, based on the location of the device, a medical facility to associate with the request;
    identifying, based on the first communication, a medical condition being experienced by the incoming patient;
    identifying at least one resource type that is associated with the medical condition being experienced by the incoming patient, wherein the at least one resource type comprises at least one of a type of medical professional, a type of medical equipment, a type of medical supplies, a type of room in the medical facility, or a type of medicine;
    retrieving a plurality of queue elements that are associated with the medical facility, wherein each queue element of the plurality of queue elements corresponds to an instance for which service at the medical facility has been requested by a respective existing patient;
    predicting, for each queue element, whether the service that has been requested by the respective existing patient will use a resource of each of the identified resource types that are associated with the medical condition being experienced by the incoming patient;
    generating, for each of the identified resource types that are associated with the medical condition being experienced by the incoming patient, a predicted resource wait time;

predicting a wait time for the incoming patient at the medical facility based on each predicted resource wait time; and transmitting, from the server to the device, a second communication that includes the wait time for the incoming patient at the medical facility.

2. The computer-implemented method according to claim 1, wherein the request is an implicit request indicating that an event is occurring or requesting directions to the medical facility.

3. The computer-implemented method according to claim 1, wherein the location of the device is identified based on location data or metadata within the first communication.

4. The computer-implemented method according to claim 1, wherein each queue element comprises at least one of identifying information about the respective existing patient, the medical condition being experienced by the respective existing patient, or a type of treatment for the medical condition being experienced by the respective existing patient.

5. The computer-implemented method according to claim 1, wherein the request indicates a change in a physiological factor of the incoming patient that is above a threshold.

6. The computer-implemented method according to claim 1, wherein the medical condition being experienced by the incoming patient is identified based on data or metadata within the first communication.

7. A system comprising:
one or more data processors; and
a non-transitory computer readable storage medium containing instructions that, when executed on the one or more data processors, cause the one or more data processors to perform actions including:
  receiving, at a server, a first communication from a device of an incoming patient, wherein the first communication corresponds to a request for a predicted wait time at at least one medical facility;
  identifying, based on the first communication, a location of the device;
  identifying, based on the location of the device, a medical facility to associate with the request;
  identifying, based on the first communication, a medical condition being experienced by the incoming patient;
  identifying at least one resource type that is associated with the medical condition being experienced by the incoming patient, wherein the at least one resource type comprises at least one of a type of medical professional, a type of medical equipment, a type of medical supplies, a type of room in the medical facility, or a type of medicine;
  retrieving a plurality of queue elements that are associated with the medical facility, wherein each queue element of the plurality of queue elements corresponds to an instance for which service at the medical facility been requested by a respective existing patient;
  predicting, for each queue element, whether the service that has been requested by the respective existing patient will use a resource of each of the identified resource types that are associated with the medical condition being experienced by the incoming patient;
  generating, for each of the identified resource types that are associated with the medical condition being experienced by the incoming patient, a predicted resource wait time;
  predicting a wait time for the incoming patient at the medical facility based on each predicted resource wait time; and
  transmitting, from the server to the device, a second communication that includes the wait time for the incoming patient at the medical facility.

8. The system according to claim 7, wherein the request is an implicit request indicating that an event is occurring or requesting directions to the medical facility.

9. The system according to claim 7, wherein the location of the device is identified based on location data or metadata within the first communication.

10. The system according to claim 7, wherein each queue element comprises at least one of identifying information about the respective existing patient, the medical condition being experienced by the respective existing patient, or a type of treatment for the medical condition being experienced by the respective existing patient.

11. The system according to claim 7, wherein the request indicates a change in a physiological factor of the incoming patient that is above a threshold.

12. The system according to claim 7, wherein the medical condition being experienced by the incoming patient is identified based on data or metadata within the first communication.

13. A computer-program product tangibly embodied in a non-transitory machine-readable storage medium, including instructions configured to cause one or more data processors to perform actions including:
  receiving, at a server, a first communication from a device of an incoming patient, wherein the first communication corresponds to a request for a predicted wait time at at least one medical facility;
  identifying, based on the first communication, a location of the device;
  identifying, based on the location of the device, a medical facility to associate with the request;
  identifying, based on the first communication, a medical condition being experienced by the incoming patient;
  identifying at least one resource type that is associated with the medical condition being experienced by the incoming patient, wherein the at least one resource type comprises at least one of a type of medical professional, a type of medical equipment, a type of medical supplies, a type of room in the medical facility, or a type of medicine;
  retrieving a plurality of queue elements that are associated with the medical facility, wherein each queue element of the plurality of queue elements corresponds to an instance for which service at the medical facility has been requested by a respective existing patient;
  predicting, for each queue element, whether the service that has been requested by the respective existing patient will use a resource of each of the identified resource types that are associated with the medical condition being experienced by the incoming patient;
  generating, for each of the identified resource types that are associated with the medical condition being experienced by the incoming patient, a predicted resource wait time;
  predicting a wait time for the incoming patient at the medical facility based on each predicted resource wait time; and
  transmitting, from the server to the device, a second communication that includes the wait time for the incoming patient at the medical facility.

14. The computer-program product according to claim 13, wherein the request is an implicit request indicating that an event is occurring or requesting directions to the medical facility.

15. The computer-program product according to claim 13, wherein the location of the device is identified based on location data or metadata within the first communication.

16. The computer-program product according to claim 13, wherein each queue element comprises at least one of identifying information about the respective existing patient, the medical condition being experienced by the respective existing patient, or a type of treatment for the medical condition being experienced by the respective existing patient.

17. The computer-program product according to claim 13, wherein the medical condition being experienced by the incoming patient is identified based on data or metadata within the first communication.

18. The computer-program product according to claim 13, wherein the request indicates a change in a physiological factor of the incoming patient that is above a threshold.

* * * * *

UNITED STATES PATENT AND TRADEMARK OFFICE
CERTIFICATE OF CORRECTION

PATENT NO. : 10,673,784 B1
APPLICATION NO. : 15/683151
DATED : June 2, 2020
INVENTOR(S) : Gabriel O. Perez Rodreguez and Fariba Borjian Azadi It is certified that error appears in the above-identified patent and that said Letters Patent is hereby corrected as shown below:

In the Claims

In Claim 7, Column 35, Line 56, before "been" please insert -- has --

Signed and Sealed this
Twenty-second Day of August, 2023

Katherine Kelly Vidal
*Director of the United States Patent and Trademark Office*